(12) United States Patent
Yudasaka et al.

(10) Patent No.: US 7,551,310 B2
(45) Date of Patent: *Jun. 23, 2009

(54) DIVISIONAL PRINT CONTROL

(75) Inventors: Shingo Yudasaka, Nagano-ken (JP); Kaoru Nakabayashi, Nagano-ken (JP); Shoichi Nakajo, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 671 days.

This patent is subject to a terminal disclaimer.

(21) Appl. No.: 10/133,208

(22) Filed: Apr. 26, 2002

(65) Prior Publication Data

US 2003/0202211 A1 Oct. 30, 2003

(51) Int. Cl.
*G06K 15/02* (2006.01)
*H04N 1/393* (2006.01)
*H04N 1/387* (2006.01)
*G06F 3/12* (2006.01)
*H04N 1/23* (2006.01)

(52) U.S. Cl. .................. 358/1.18; 358/1.2; 358/450; 358/451

(58) Field of Classification Search .................. None
See application file for complete search history.

(56) References Cited

U.S. PATENT DOCUMENTS

| | | | | |
|---|---|---|---|---|
| 5,311,259 | A * | 5/1994 | Moriya et al. | 399/86 |
| 5,566,004 | A * | 10/1996 | Imaizumi et al. | 358/450 |
| 5,644,411 | A | 7/1997 | Tamagaki et al. | |
| 5,825,996 | A * | 10/1998 | Davis et al. | 358/1.18 |
| 5,951,174 | A * | 9/1999 | Handa | 400/120.01 |
| 6,222,949 | B1* | 4/2001 | Nakata | 382/298 |
| 6,507,411 | B1* | 1/2003 | Nishikawa et al. | 358/1.2 |
| 6,591,076 | B2* | 7/2003 | Connors | 399/194 |

(Continued)

FOREIGN PATENT DOCUMENTS

EP 0 450 552 A 10/1991

(Continued)

OTHER PUBLICATIONS

Abstract of Japanese Patent Publication No. 08-072355, Pub. Date: Mar. 19, 1996, Patent Abstracts of Japan.

Primary Examiner—Twyler L Haskins
Assistant Examiner—Myles D Robinson
(74) Attorney, Agent, or Firm—Martine Penilla & Gencarella, LLP

(57) ABSTRACT

The technique of the present invention enhances the workability of bonding and improves the finish in poster printing. The procedure first sets multiple areas adjacent to one another in an image expressed by master image data, where each of the multiple areas corresponds to each unit page to be printed. The procedure then enlarges each of the adjacent areas by preset dimensions (corresponding to an enlarged area in marginless printing) and sequentially extracts image data included in each enlarged area. The procedure subsequently magnifies the extracted image data by a predetermined magnification to generate each piece of page image data. The area actually printed is a little greater than the size of each sheet of printing paper. This arrangement thus enables an image part, for example, each part of a letter 'A', to be printed to the top, bottom, left, and right sides of each sheet of printing paper. The image part printed in each sheet of printing paper is continuous with the image part printed in an adjoining sheet of printing paper.

7 Claims, 19 Drawing Sheets

U.S. PATENT DOCUMENTS

| | | | |
|---|---|---|---|
| 6,652,171 B1 * | 11/2003 | Onishi | 400/621 |
| 6,690,482 B1 * | 2/2004 | Toyoda et al. | 358/1.2 |
| 6,771,384 B1 * | 8/2004 | Laverty et al. | 358/1.15 |
| 6,857,798 B2 * | 2/2005 | Matsuyama | 400/76 |
| 2001/0000126 A1 | 4/2001 | Kinjo | |
| 2003/0152729 A1 * | 8/2003 | Hirasawa | 428/40.1 |
| 2003/0174346 A1 * | 9/2003 | Nagatani | 358/1.2 |
| 2004/0109053 A1 * | 6/2004 | Ray | 347/101 |

FOREIGN PATENT DOCUMENTS

| | | |
|---|---|---|
| EP | 0 926 882 A | 6/1999 |
| EP | 1253773 A2 * | 10/2002 |
| EP | 1667424 A2 * | 6/2006 |
| JP | 08-072355 | 3/1996 |
| JP | 2000218887 A * | 8/2000 |
| JP | 2001-347720 A * | 12/2001 |
| JP | 2002321422 A * | 11/2002 |

* cited by examiner

Fig.19
MASTER IMAGE DATA
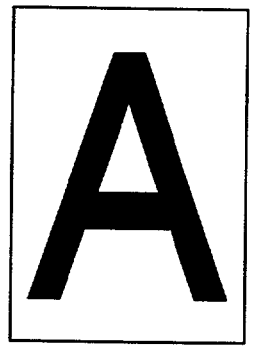
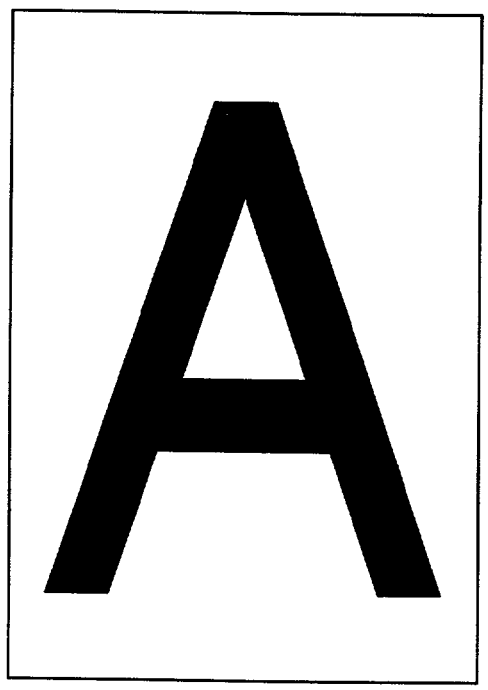

DIVISIONAL PRINT CONTROL

BACKGROUND OF THE INVENTION

1. Field of the Invention

The present invention relates to a divisional print control technique that causes a printing image of interest to be divisionally printed in multiple sheets of printing paper.

2. Description of the Related Art

The 'poster printing' technique has been proposed to magnify a one-page image and divisionally print the magnified image in multiple sheets of printing paper having a specific size. A large print like a poster is obtained by joining the respective sheets of printing paper with image parts divisionally printed thereon.

In the prior art technique, there are margins on the circumference of each sheet of printing paper used for divisional printing. The user accordingly cuts off the margins with a pair of scissors or a cutter knife, before bonding the sheets of printing paper to one another. Namely the bonding work takes some time. It is not easy to accurately cut off the margins. There may thus be a gap at the joint or discontinuity of adjoining image parts. This results in poor finish of the large print obtained by bonding.

SUMMARY OF THE INVENTION

The object of the present invention is thus to enhance workability of bonding and improve finish in poster printing.

At least part of the above and the other related objects is attained by a first print controller that magnifies an image expressed by master image data by a predetermined magnification and causes the magnified image to be divisionally printed in plural sheets of printing paper. The first print controller includes: an area setting module that sets multiple areas adjacent to one another in the master image data, where each of the multiple areas corresponds to each unit page to be printed; an enlargement-extraction module that enlarges each of the areas, which are set by the area setting module, by preset dimensions and sequentially extracts image data included in each enlarged area; a magnification module that magnifies each of the image data, which is extracted by the enlargement-extraction module, by the predetermined magnification; a command output module that outputs a command, which instructs printing page image data of a greater size than the size of the printing paper actually used for printing, to a printing device; and an output control module that outputs each of the magnified image data corresponding to the page image data of the greater size to the printing device.

The present invention is also directed to a second print controller that magnifies an image expressed by master image data by a predetermined magnification and causes the magnified image to be divisionally printed in plural sheets of printing paper. The second print controller includes: a magnification module that magnifies the image expressed by the master image data by the predetermined magnification; an area setting module that sets multiple areas adjacent to one another in the master image data magnified by the magnification module, where each of the multiple areas has identical dimensions with those of each sheet of printing paper; an enlargement-extraction module that enlarges each of the areas, which are set by the area setting module, by preset dimensions and sequentially extracts image data included in each enlarged area; a command output module that outputs a command, which instructs printing page image data of a greater size than the size of the printing paper actually used for printing, to a printing device; and an output control module that outputs each of the extracted image data corresponding to the page image data of the greater size to the printing device.

The present invention is further directed to a third print controller that causes a printing image to be divisionally printed in multiple sheets of printing paper. The third print controller includes: an area setting module that sets multiple areas adjacent to one another in print image data representing the printing image, where each of the multiple areas has identical dimensions with those of each sheet of printing paper; an enlargement-extraction module that enlarges each of the areas, which are set by the area setting module, by preset dimensions and sequentially extracts image data included in each enlarged area; a command output module that outputs a command, which instructs printing page image data of a greater size than the size of the printing paper actually used for printing, to a printing device; and an output control module that outputs each of the extracted image data corresponding to the page image data of the greater size to the printing device.

In any of the first through the third print controllers, the page image data has the greater size than the size of printing paper.

Even when there is a slight deviation in feed of printing paper, this arrangement ensures printing to the respective sides of the printing paper. The respective areas set by the area setting module are adjacent to one another. There is accordingly little possibility that an image part expressed by one piece of page image data is discontinuous with an image part expressed by an adjoining piece of page image data. Any of the first through the third print controllers enables the respective sheets of printing paper with the image parts printed thereon to be readily and precisely joined together without cutting the margins. This arrangement thus ensures the excellent workability of bonding and the favorable finish of the resulting large print obtained by bonding.

The first and the second print controllers enable even a master image of a relatively small size to be magnified for divisional printing, whereas the third print controller is suitable for divisional printing of an image having a relatively large size.

In accordance with one preferable application, any of the first through the third print controller further includes: a marginless printing specification module that accepts marginless printing specification, which represents printing without any margins on respective sides of printing paper; and a module that, only when the marginless printing specification module accepts the marginless printing specification, activates the enlargement-extraction module to enlarge each of the areas while activating the marginless print command output module to output the command, which instructs printing in the printing area of the greater size.

This arrangement enables the user to select a desired print mode between marginless printing, which represents printing without any margins on respective sides of printing paper, and standard printing with margins, thus ensuring the excellent operatability.

In one preferable embodiment, the print controller of the above application that is capable of selecting execution or non-execution of marginless printing has a first input setting module that sets a first data input box on a window for data input displayed on a display device, where various pieces of information with regard to divisional printing to the multiple sheets of printing paper are input in the first data input box. The marginless printing specification module includes a second input setting module that sets a second data input box, where the marginless printing specification is accepted, on the window with the first data input box.

This arrangement enables the operator to specify the various pieces of information with regard to divisional printing and give an instruction of divisional printing in an identical window for data input, thus ensuring the excellent operatability.

Another application of the present invention is a print control method corresponding to each of the print controllers discussed above. The present invention is accordingly directed to a first print control method that magnifies an image expressed by master image data by a predetermined magnification and causes the magnified image to be divisionally printed in plural sheets of printing paper. The print control method includes the steps of: (a) setting multiple areas adjacent to one another in the master image data, where each of the multiple areas corresponds to each unit page to be printed; (b) enlarging each of the areas, which are set in the step (a), by preset dimensions and sequentially extracting image data included in each enlarged area; (c) magnifying each of the image data, which is extracted in the step (b), by the predetermined magnification; (d) outputting a command, which instructs printing page image data of a greater size than the size of the printing paper actually used for printing, to a printing device; and (e) outputting each of the magnified image data corresponding to the page image data of the greater size to the printing device.

The present invention is also directed to a second print control method that magnifies an image expressed by master image data by a predetermined magnification and causes the magnified image to be divisionally printed in plural sheets of printing paper. The second print control method includes the steps of: (a) magnifying the image expressed by the master image data by the predetermined magnification; (b) setting multiple areas adjacent to one another in the master image data magnified in the step (a), where each of the multiple areas has identical dimensions with those of each sheet of printing paper; (c) enlarging each of the areas, which are set in the step (b), by preset dimensions and sequentially extracting image data included in each enlarged area; (d) outputting a command, which instructs printing page image data of a greater size than the size of the printing paper actually used for printing, to a printing device; and (e) outputting each of the extracted image data corresponding to the page image data of the greater size to the printing device.

The present invention is further directed to a third print control method that causes a printing image to be divisionally printed in multiple sheets of printing paper. The third print control method includes the steps of: (a) setting multiple areas adjacent to one another in print image data representing the printing image, where each of the multiple areas has identical dimensions with those of each sheet of printing paper; (b) enlarging each of the areas, which are set in the step (a), by preset dimensions and sequentially extracting image data included in each enlarged area; (c) outputting a command, which instructs printing page image data of a greater size than the size of the printing paper actually used for printing, to a printing device; and (d) outputting each of the extracted image data corresponding to the page image data of the greater size to the printing device.

Still another application of the present invention is a recording medium in which each of the print control methods discussed above is recorded in a computer readable manner. The present invention is accordingly directed to a first recording medium in which a computer program is recorded in a computer readable manner. The computer program functions to magnify an image expressed by master image data by a predetermined magnification and cause the magnified image to be divisionally printed in plural sheets of printing paper. The computer program causes a computer to attain the functions of: (a) setting multiple areas adjacent to one another in the master image data, where each of the multiple areas corresponds to each unit page to be printed; (b) enlarging each of the areas, which are set by the function (a), by preset dimensions and sequentially extracting image data included in each enlarged area; (c) magnifying each of the image data, which is extracted by the function (b), by the predetermined magnification; (d) outputting a command, which instructs printing image data of a greater size than the size of the printing paper actually used for printing, to a printing device; and (e) outputting each of the magnified image data corresponding to the page image data of the greater size to the printing device.

The present invention is also directed to a second recording medium in which a computer program is recorded in a computer readable manner. The computer program functions to magnify an image expressed by master image data by a predetermined magnification and cause the magnified image to be divisionally printed in plural sheets of printing paper. The computer program causes a computer to attain the functions of: (a) magnifying the image expressed by the master image data by the predetermined magnification; (b) setting multiple areas adjacent to one another in the master image data magnified by the function (a), where each of the multiple areas has identical dimensions with those of each sheet of printing paper; (c) enlarging each of the areas, which are set by the function (b), by preset dimensions and sequentially extracting image data included in each enlarged area; (d) outputting a command, which instructs printing page image data of a greater size than the size of the printing paper actually used for printing, to a printing device; and (e) outputting each of the extracted image data corresponding to the page image data of the greater size to the printing device.

The present invention is further directed to a third recording medium in which a computer program is recorded in a computer readable manner. The computer program functions to cause a printing image to be divisionally printed in multiple sheets of printing paper. The computer program causes a computer to attain the functions of: (a) setting multiple areas adjacent to one another in print image data representing the printing image, where each of the multiple areas has identical dimensions with those of each sheet of printing paper; (b) enlarging each of the areas, which are set by the function (a), by preset dimensions and sequentially extracting image data included in each enlarged area; (c) outputting a command, which instructs printing page image data of a greater size than the size of the printing paper actually used for printing, to a printing device; and (d) outputting each of the extracted image data corresponding to the page image data of the greater size to the printing device.1

Like the first through the third print controllers discussed above, the corresponding first through third print control methods and the first through the third recording media ensure the excellent workability of bonding and the favorable finish of the resulting large print obtained by bonding.

The technique of the present invention may be attained by other applications. The first application is a computer program recorded in any of the first through the third recording media described above. The second application is a program supply apparatus that supplies the computer program via a communication path. In the second application, the computer program is stored, for example, in a server on a computer network and is downloaded to the computer via the communication path to be executed and actualize any of the print controllers and print control methods discussed above.

These and other objects, features, aspects, and advantages of the present invention will become more apparent from the following detailed description of the preferred embodiments with the accompanying drawings.

BRIEF DESCRIPTION OF THE DRAWINGS

FIG. 19 shows an example of magnifying a master image; and

DESCRIPTION OF THE PREFERRED EMBODIMENTS

Figure 1:
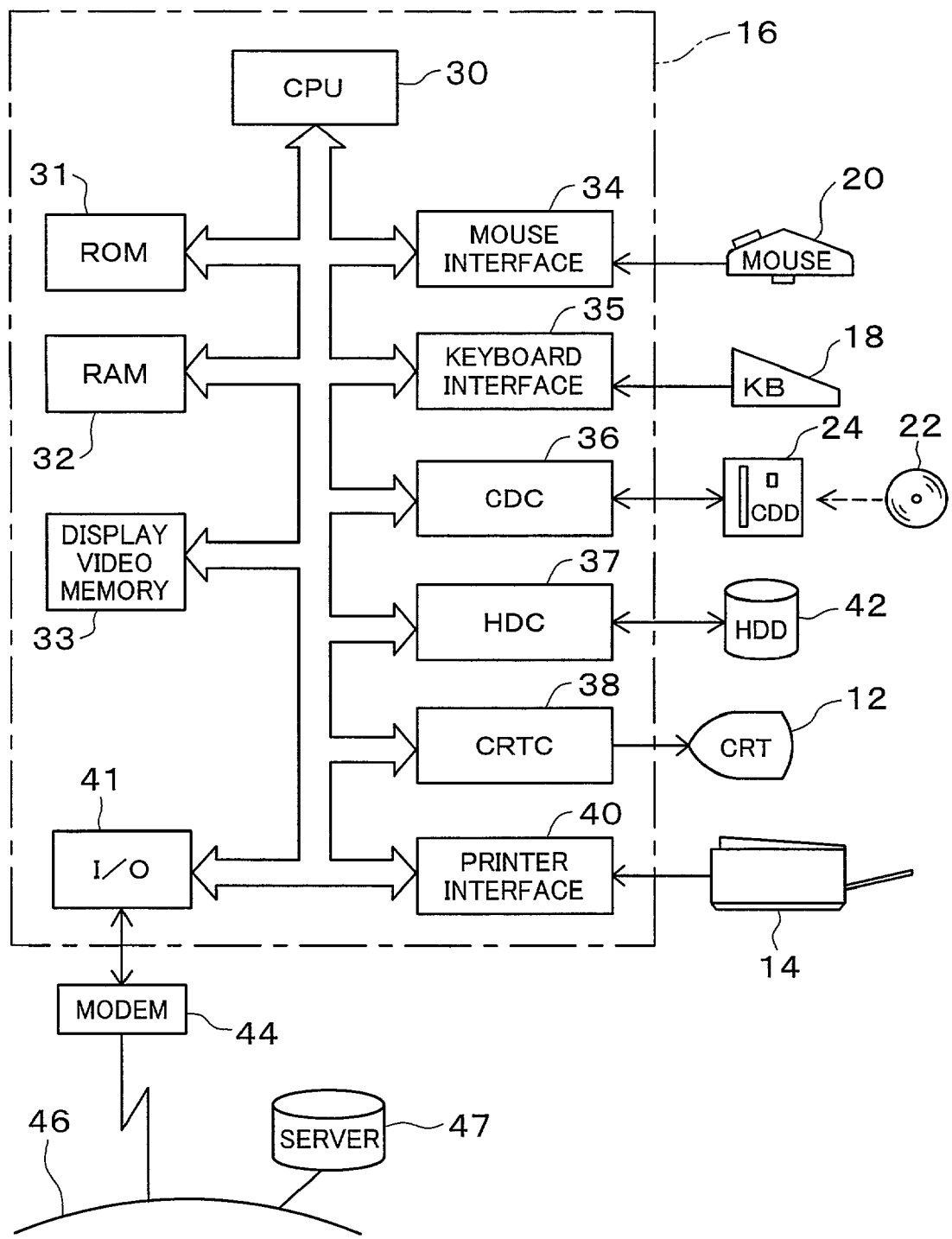
FIG. 1 is a block diagram schematically illustrating the hardware construction of a computer system in a first embodiment of the present invention.

FIG. 1 is a block diagram schematically illustrating the hardware construction of a computer system in a first embodiment of the present invention. The computer system includes a personal computer (hereinafter simply referred to as the computer) as its center and a CRT display 12 and a printer 14 as peripheral equipment. The computer has a computer main body 16, a keyboard 18, and a mouse 20. The computer main body 16 is provided with a CD driver 24 for reading a CD-ROM 22.

The printer 14 is an ink jet printer that ejects ink droplets to create dots on surface of a sheet of printing paper. In the printer 14, a carriage is moved back and forth in a main scanning direction, while the sheet of printing paper is fed in a sub-scanning direction. An image is accordingly recorded on the sheet of printing paper. The printer 14 is not restricted to the ink jet printer but may be a printer of another mechanism, for example, a laser printer or a dot impact printer.

The computer main body 16 includes a CPU 30 as a central processing unit, a ROM 31, a RAM 32, a display video memory 33, a mouse interface 34, a keyboard interface 35, a CDC 36, an HDC 37, a CRTC 38, a printer interface 40, and an I/O port 41, which are mutually connected via a bus. The ROM 31 is a read only memory that stores a variety of programs therein. The RAM 32 is a readable writable memory that stores a diversity of data therein. The display video memory 33 stores therein image data representing an image to be displayed on the CRT display 12. The mouse interface 34 is in charge of data transmission to and from the mouse 20. The keyboard interface 35 is in charge of key input from the keyboard 18. The CDC 36 is a CD controller that controls a CD driver (CDD) 24. The HDC 37 is a hard disk controller that controls a hard disk driver (HDD) 42. Image data of interest as an object to be printed (hereinafter referred to as master image data) is stored in advance in the HDD 42.

The CRTC 38 is a CRT controller that controls display of images on the CRT display 12, based on display image data stored in the display video memory 33. The printer interface 40 controls data output to the printer 14. The I/O port 41 is provided with a serial output port and is connected to a modem 44 to be further linked with a public telephone network 46 via the modem 44. The computer main body 16 is connected to an external network via the modem 44 to gain access to a specific server 47.

In this computer system, an operating system is stored in the HDD 42 and is loaded to a predetermined area in the RAM 32 according to a loader written in a boot block of the HDD 42 in response to power supply to the computer main body 16. A printer driver provided for each type of the printer 14 is stored in advance in a CD-ROM 22 and is installed from the CD drive 24 into the computer main body 16 by activating a predetermined installation program. The installed printer driver is stored in the HDD 42, and is incorporated in the operating system to be loaded to the predetermined area in the RAM 32 in response to power supply to the computer main body 16.

Another computer program prepared in this computer system is an application program for poster printing preset image data. The application program is stored in advance in another CD-ROM 22 and is installed from the CD driver 24 into the computer main body 16 by activating a predetermined installation program. The installed application program is stored in the HDD 42, and is loaded to a specified area in the RAM 32 in response to a given activation command.

The CPU 30 executes the application program for poster printing, so as to attain the respective constituents of the present invention. The application program may be stored in another mobile recording medium (carriable recording medium), such as a floppy disk, a magneto-optic disc, or an IC card, in place of the CD-ROM 22. The application program may alternatively be program data that is downloaded via the external network from the specific server 47 connecting with the external network and is transferred to the RAM 32 or the HDD 42. When the external network is the Internet, the application program may be downloaded from a specific homepage. The application program may otherwise be supplied in the form of attachments to E mails.

Figure 2:
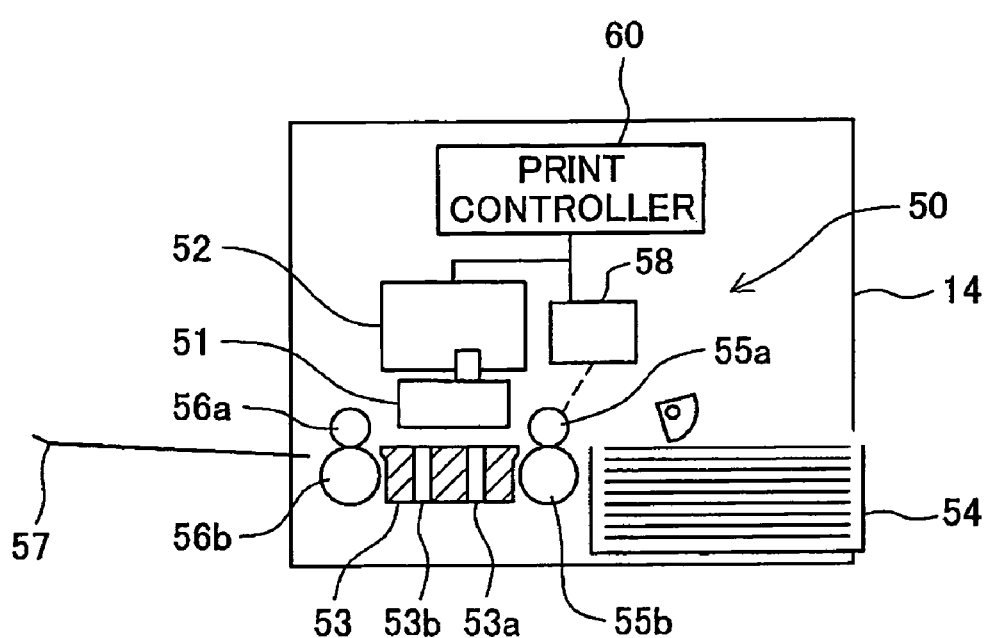
FIG. 2 schematically illustrates the structure of a printer included in the computer system of FIG. 1.

FIG. 2 schematically illustrates the structure of the printer 14. The printer 14 has a printing mechanism 50 and a print controller 60 that controls the printing mechanism 50. The print controller 60 is constructed as a microcomputer including a CPU that executes diverse programs, a ROM, and a RAM. The printing mechanism 50 has a print head 51, a carriage 52 that moves back and forth to shift the print head 51 mounted thereof, a platen 53 that is located at a position facing the print head 51, a sheet cassette 54 that keeps plural sheets of printing paper therein, a pair of sheet feed rollers 55a and 55b that feed up each sheet of printing paper in the sheet cassette 54 to the platen 53, a pair of sheet discharge rollers 56a and 56b that discharges each printed sheet, a paper tray 57 that receives discharge of printed sheets, and a sensor 58 that measures actuating quantities of the sheet feed rollers 55a and 55b.

Figure 3:
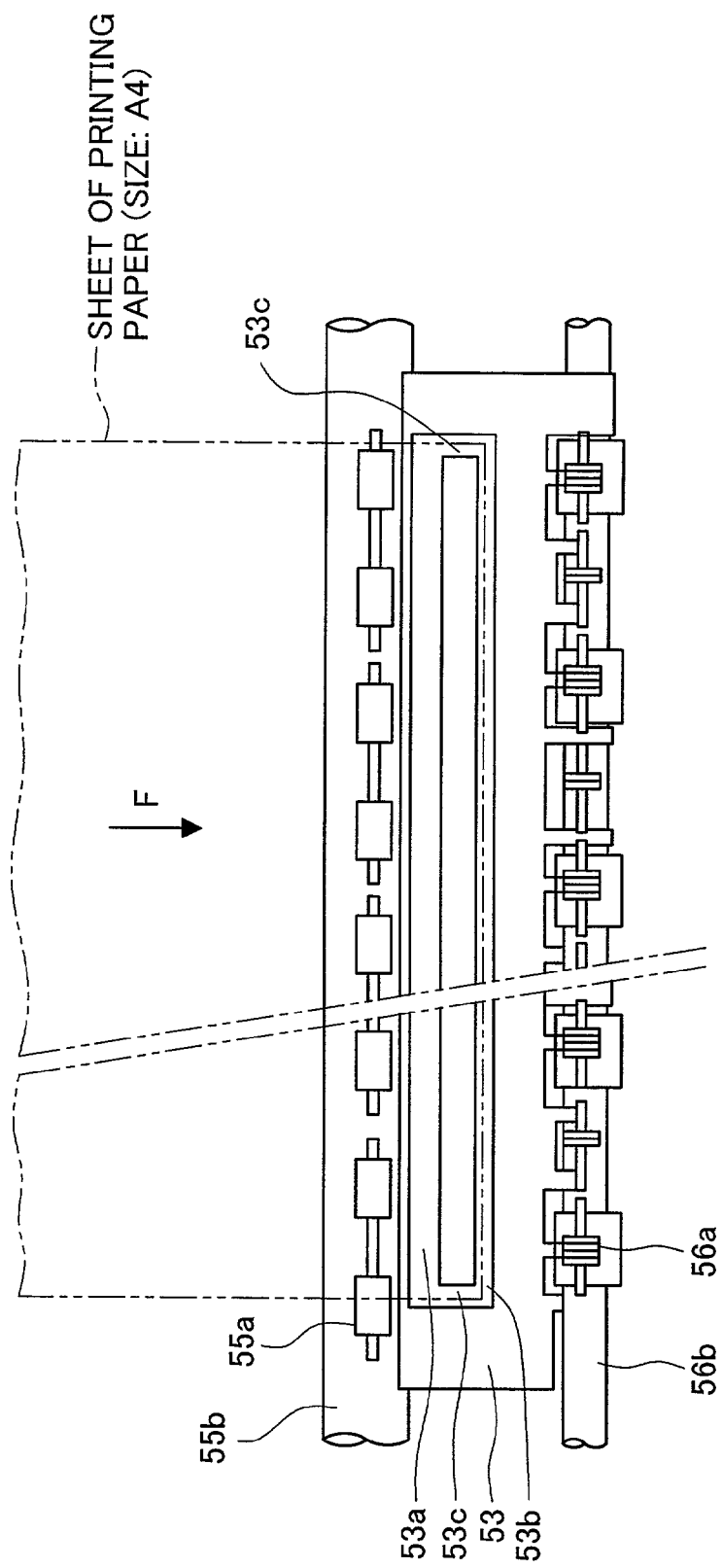
FIG. 3 is a plan view illustrating a platen of the printer.

FIG. 3 is a plan view illustrating the platen 53 of the printer 14. As illustrated in FIG. 3, the platen 53 is provided with a pair of ink receiving vertical openings 53c extending in a direction parallel to a sheet feeding direction F, as well as multiple ink receiving lateral openings 53a and 53b extending in a scanning direction or a direction perpendicular to the sheet feeding direction F. The pair of ink receiving vertical openings 53c are laid out to make left and right sides of an A4-size printing sheet (this printer 14 is exclusively used for the size A4) pass immediately above the respective openings 53c. The multiple ink receiving lateral openings 53a and 53b are arranged on the sheet feeding side and the sheet discharging side. Each of these openings is filled with an ink adsorbent.

The structure of the platen 53 with the openings and the ink adsorbent enables the printer 14 to carry out marginless printing with no margins left on the four sides of the printing sheet. In the case of marginless printing, in order to ensure printing on the respective ends of the printing sheet, it is required to generate a printing image for an area of a slightly greater size than the size of the printing sheet. In the process of utilizing the application program (more specifically, the application program for poster printing described above) to generate image data, the user selects a 'With No Margins on Four Sides' mode as the print form at the phase of setting the size of the printing sheet. Selection of the 'With No Margins on Four Sides' mode sets dimensions equivalent to those of an enlarged printing area for the A4-size printing sheet discussed below. A printing image is then generated in the newly set dimensions.

Figure 4:
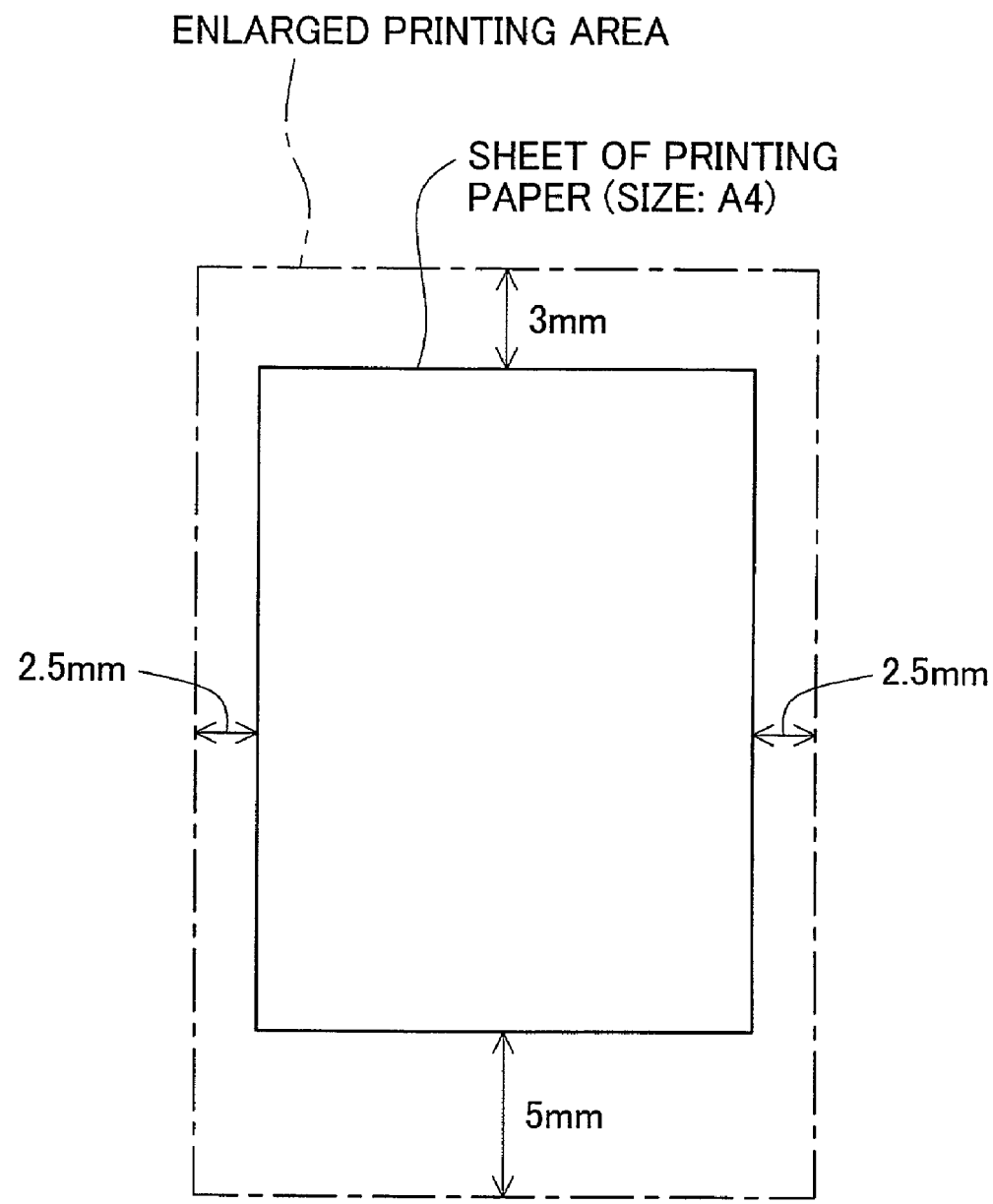
FIG. 4 shows an enlarged printing area for an A4-size printing sheet.

FIG. 4 shows an enlarged printing area for the A4-size printing sheet. As illustrated in FIG. 4, the enlarged printing area is specified by extending the printing sheet as the reference by predetermined enlargement quantities in the respective directions. In the illustrated example, the enlargement quantity on the front side in the sheet feeding direction F is 3 mm, the enlargement quantity on the rear side is 5 mm, and the enlargement quantity on the left and right sides is 2.5 mm. The enlargement quantities in the respective directions are determined according to the skew of the printing sheet and the tolerance of the sheet feed quantity.

In the case of marginless printing with this printer 14, when the four ends of the printing sheet are located respectively above the ink receiving openings 53a, 53b, and 53c, ink is ejected from the print head 51 to make ink droplets hit on the respective ends of the printing sheet. The ink receiving openings 53a, 53b, and 53c function to receive ink droplets that fail in hitting the ends of the printing sheet. This arrangement ensures successful printing to the respective ends of the printing sheet without spotting the platen 53.

Figure 5:
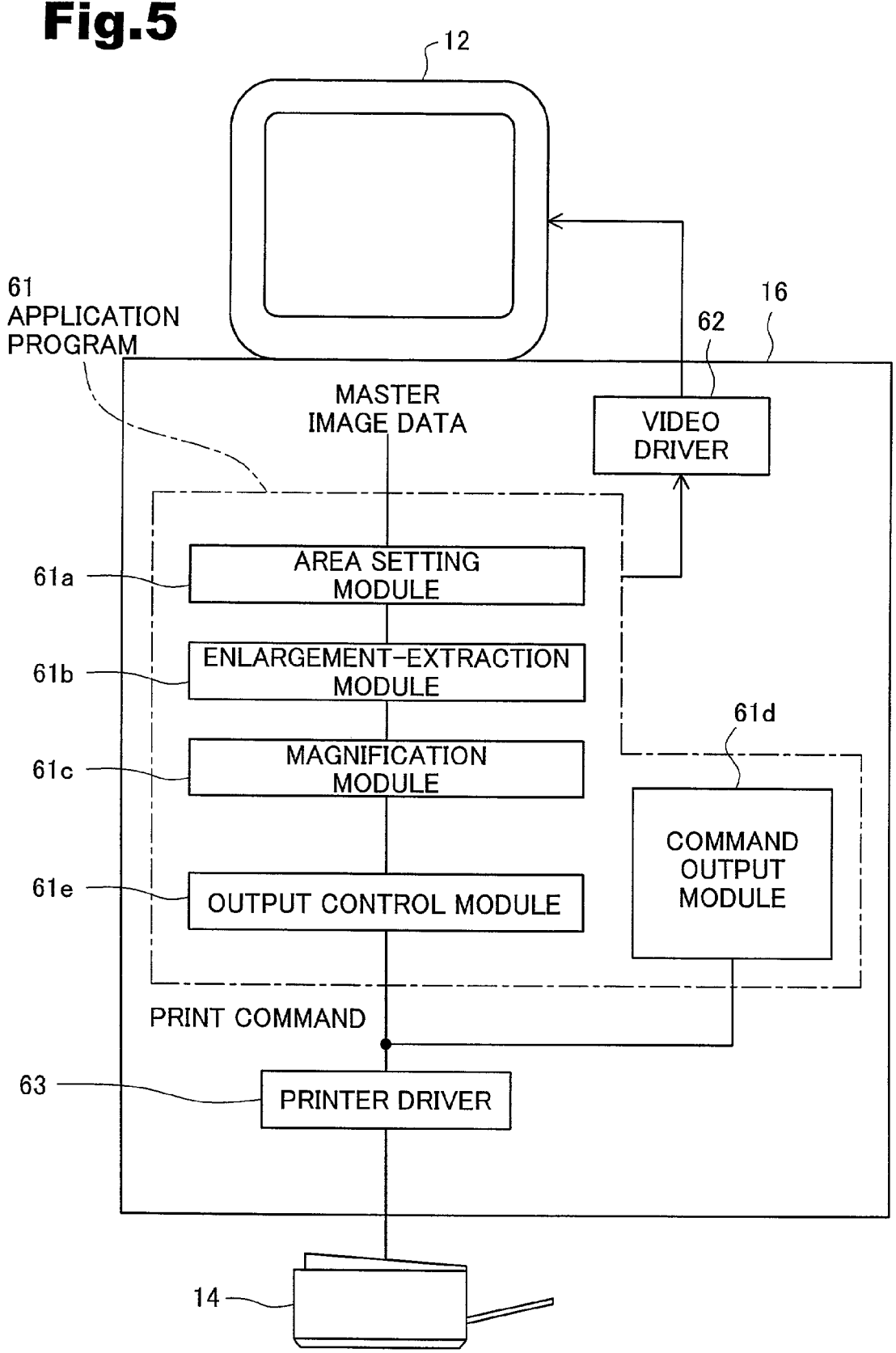
FIG. 5 is a block diagram illustrating a series of processing executed in a computer main body to process master image data and attain poster printing.

In the computer system having the hardware construction discussed above, poster printing is carried out according to the application program. The process of poster printing is discussed below. FIG. 5 is a block diagram illustrating a series of processing executed in the computer main body 16 to process master image data and attain poster printing. As illustrated in FIG. 5, an application program 61 for poster printing activated in the computer main body 16 generates multiple pieces of page image data corresponding to respective unit pages to be printed from master image data, and sequentially outputs the generated multiple pieces of page image data as a print command to a printer driver 63 also activated in the computer main body 16. The printer driver 63 converts the page image data into printable signals and transmits the converted printable signals to the printer 14.

In the application program 61, an area setting module 61a sets multiple adjoining areas in the master image data, which correspond to the respective pages to be printed. An enlargement-extraction module 61b enlarges each of the multiple areas by preset dimensions and sequentially extracts image data included in each enlarged area. A magnification module 61c magnifies each of the image data by a predetermined magnification. The predetermined magnification here represents a ratio of magnifying the image expressed by the extracted image data to a printing image output from the printer 14. A command output module 61d outputs a command (marginless print command), which instructs printing page image data of a greater size than the size of the printing paper actually used for printing, to the printer driver 63, and an output module 61e outputs each of the magnified image data corresponding to the page image data of the greater size to the printing device 63.

The application program 61 of the above configuration controls the process of poster printing, which magnifies an image expressed by the master image data by the predetermined magnification and causes the magnified image to be divisionally printed in plural sheets of printing paper. The application program 61 causes the master image data, the layout of poster printing, and other diverse images to be displayed on the CRT display 12 via a video driver 62, while carrying out the above series of processing for poster printing.

Figure 6:
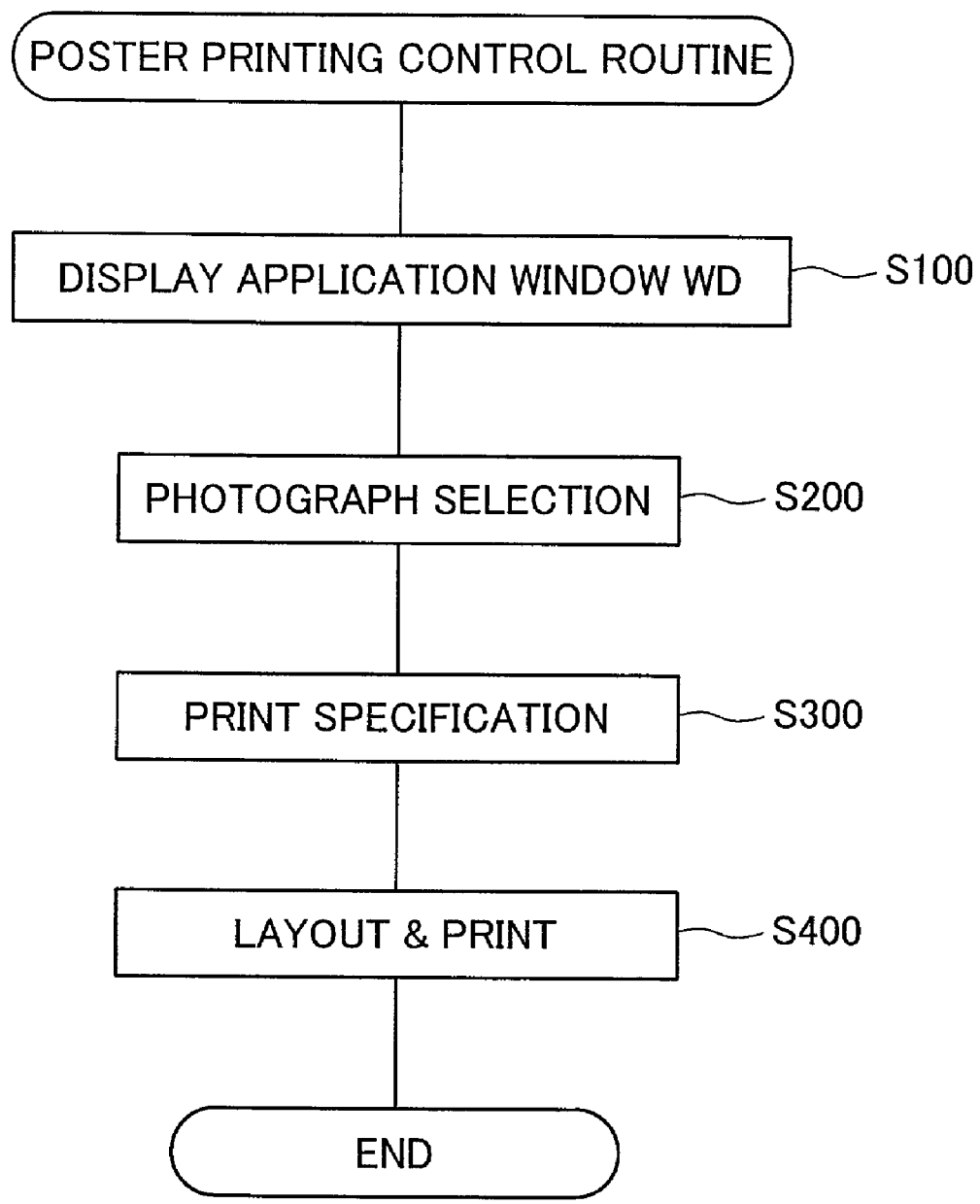
FIG. 6 is a flowchart showing a poster printing control routine.

More specifically, the CPU 30 of the computer main body 16 executes the application program 61 to implement the poster printing. The following describes the details of a poster printing control process according to the application program 61. FIG. 6 is a flowchart showing a routine of this poster printing control process. This routine is iteratively carried out at preset time intervals after an instruction is given to execute the application program 61 for poster printing.

Figure 7:
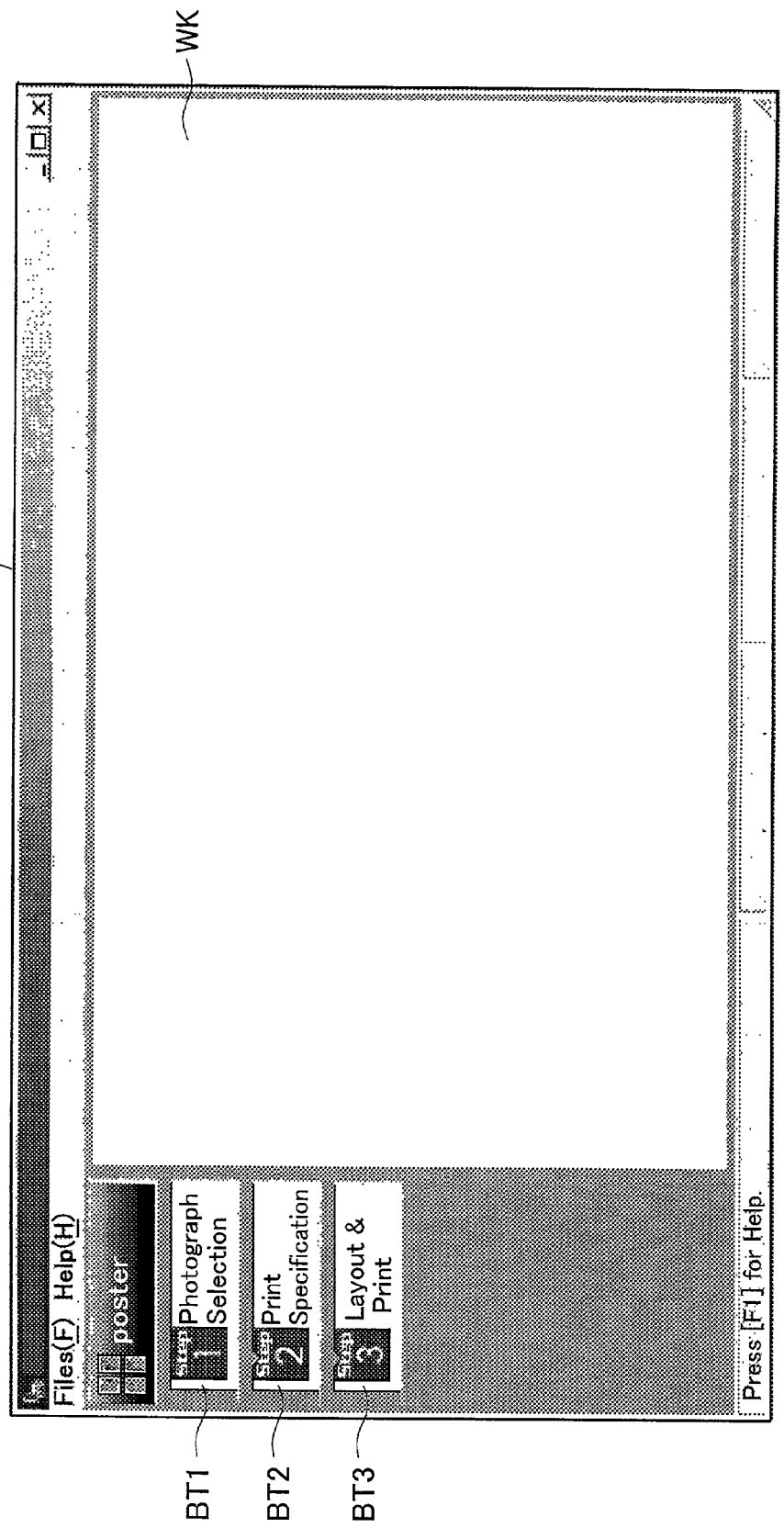
FIG. 7 shows the initial state of an application window WD.

Referring to the flowchart of FIG. 6, when the program enters the routine, the CPU 30 first causes an application window WD to be displayed on the CRT display 12 (step S100). FIG. 7 shows the initial state of the application window WD. As illustrated in FIG. 7, the application window WD has three buttons BT1, BT2, and BT3 'Photograph Selection', 'Print Specification', and 'Layout & Print'. The operator sequentially clicks these buttons BT1 to BT3 with the mouse 20, so as to advance the work flow of poster printing on the screen of the CRT display 12. Referring back to FIG. 6, after execution of step S100, the CPU 30 receives operation commands in response to clicks of the buttons BT1, BT2, and BT3 with the mouse 20 to sequentially carry out a photograph selection process, a print specification process, and a layout & print process corresponding to the respective operation commands (steps S200, S300, and S400).

The photograph selection process carried out at step S200 selects image data of, for example, a photograph. In this embodiment, the CPU 30 selects master image data of interest to be printed, out of the storage in the HDD 42. In accordance with a concrete procedure, the CPU 30 receives a file name input through the operations of the keyboard 18 or the mouse 20 and reads the master image data specified by the file name from the HDD 42 into the RAM 32. The CPU 30 subsequently causes the read-out master image data to be displayed in a word area WK of the application window WD.

Figure 8:
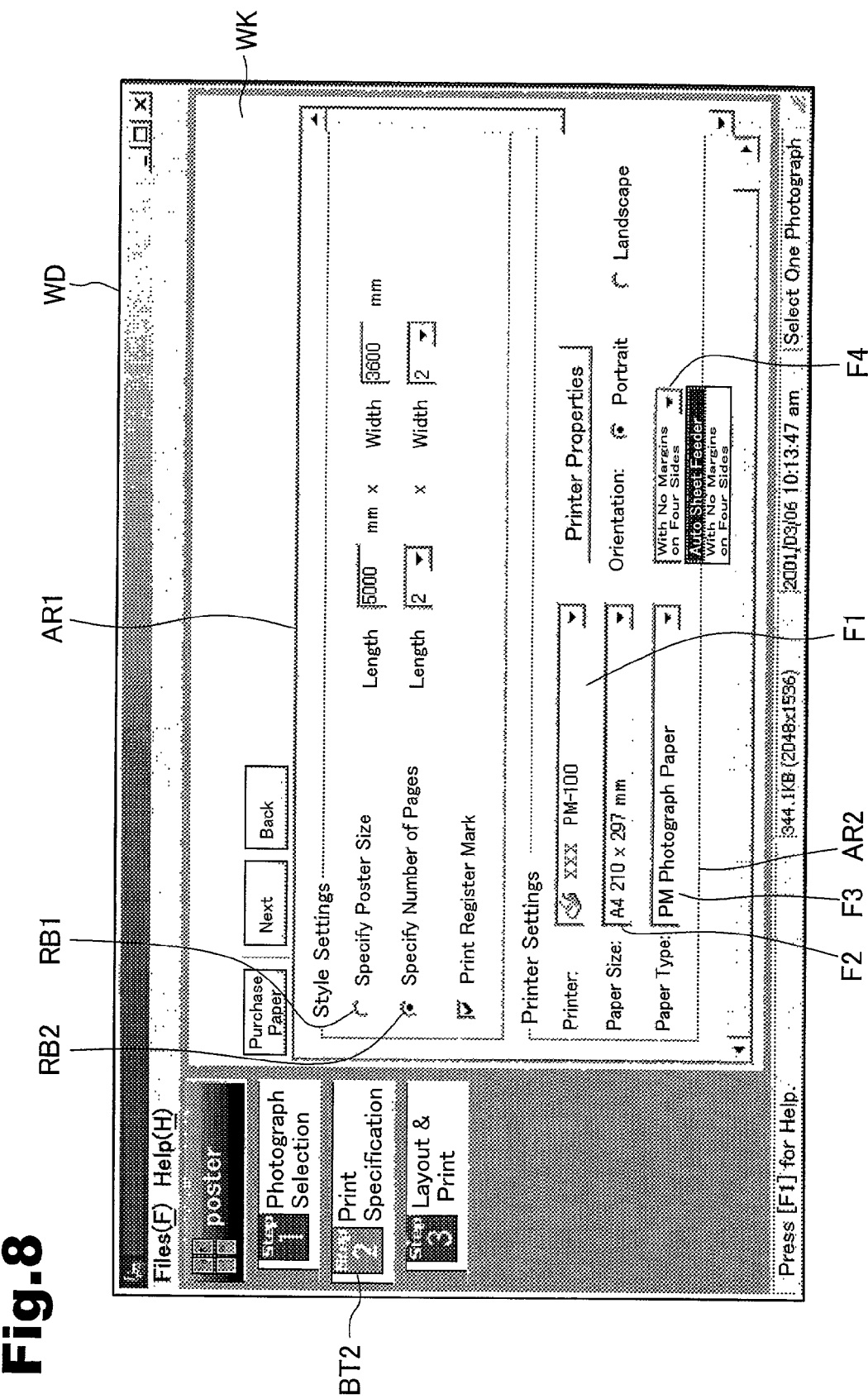
FIG. 8 shows the application window WD in the print specification process.

The print specification process carried out at step S300 specifies diverse pieces of information relating to poster printing. The diverse pieces of information include, for example, the size of the printing image output from the printer (hereinafter referred to as the output size) and the size of the printing sheet. FIG. 8 shows the application window WD in the print specification process. The CPU 30 first causes an input window for print specification to be displayed in the work area WK of the application window WD as shown in FIG. 8.

The input window for print specification has a 'Style Settings' area AR1 and a 'Printer Settings' area AR2. The output size is set in the 'Style Settings' area AR1. In response to a click of a radio button RB1, the output size of the length and the width is specified as the absolute size. In response to a click of a radio button RB2, the output size of the length and the width is specified indirectly as the numbers of pages. The 'Printer Settings' area AR2 includes three data input boxes F1, F2, and F3 'Printer', 'Paper Size', and 'Paper Type'. The model name of the printer used for printing is input in the 'Printer' data input box F1. The size of printing paper is input in the 'Paper Size' data input box F2. The type of printing paper is input in the 'Paper Type' data input box F3. There is another data input box F4, in which the specific print mode 'With No Margins on Four Sides' is set, on the right side of the 'Paper Type' data input box F3.

At step S300 in the flowchart of FIG. 6, after the display of the input window for print specification, the CPU 30 waits for data input on the input window through the operations of the keyboard 18 or the mouse 20.

Figure 9:
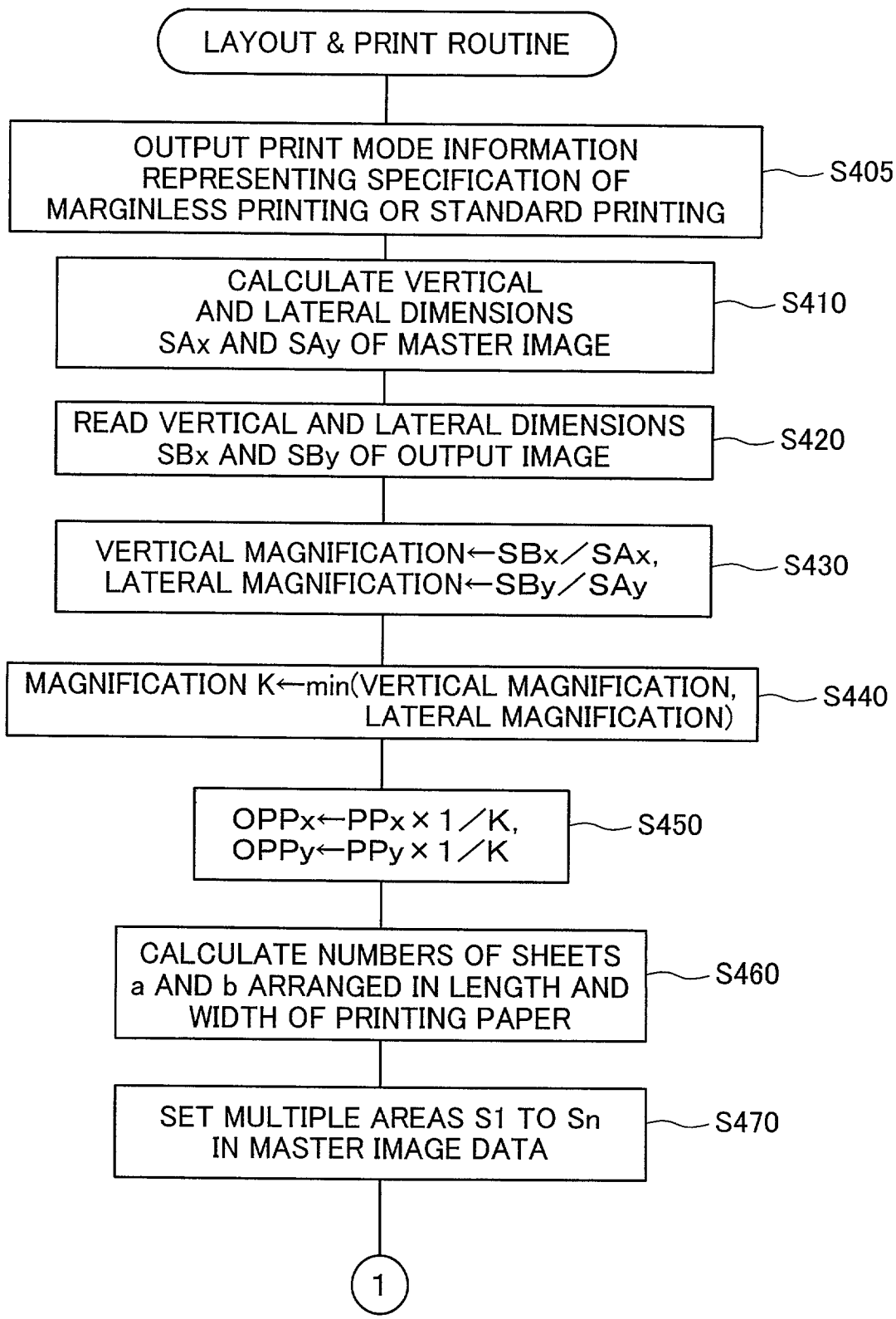
FIG. 9 is a flowchart showing a first half of the layout & print process carried out at step S400 in the flowchart of FIG. 6.
Figure 10:
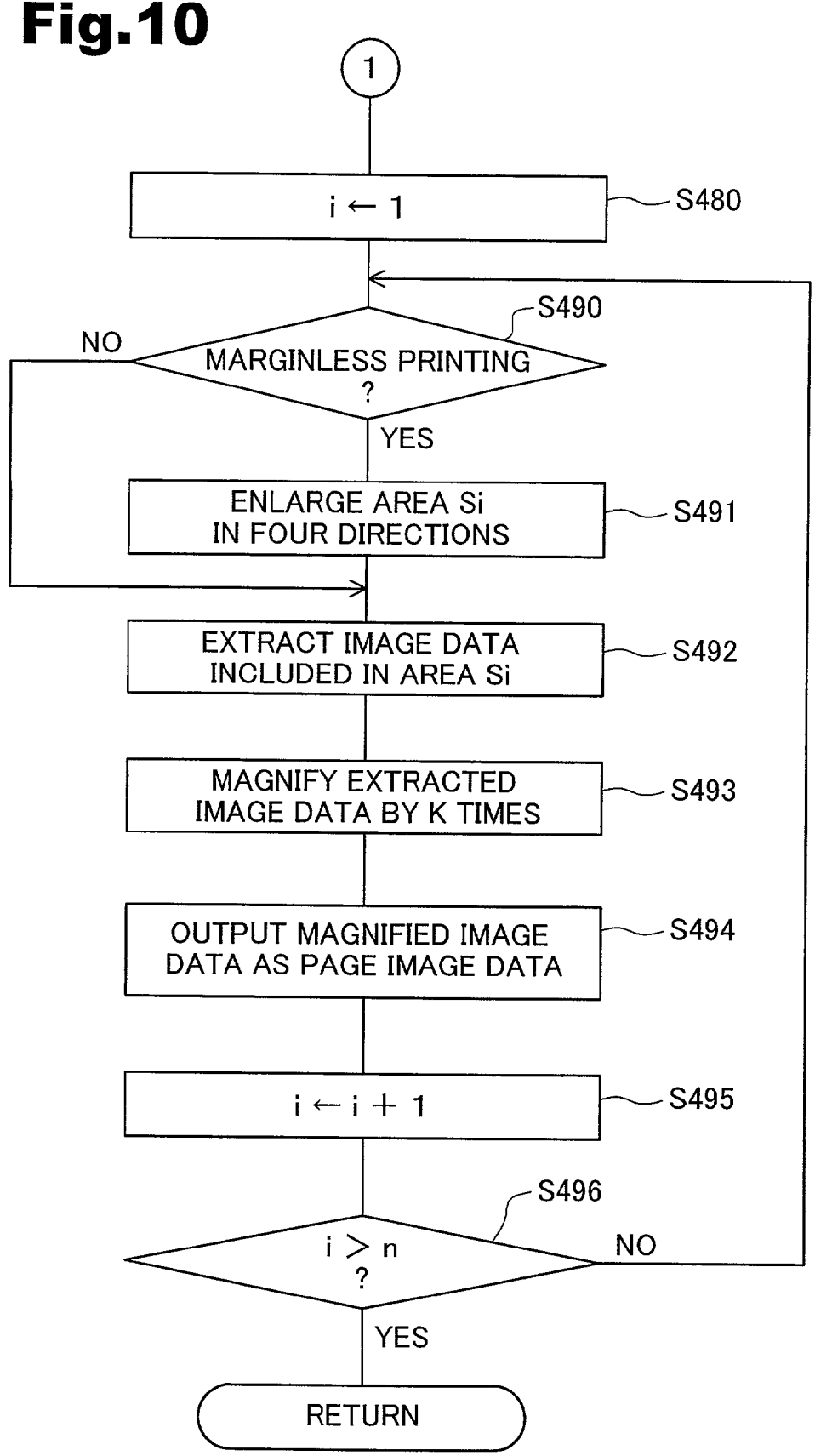
FIG. 10 is a flowchart showing a second half of the layout & print process carried out at step S400 in the flowchart of FIG. 6.

The following describes the details of the layout & print process carried out at step S400 after completion of step S300 in the flowchart of FIG. 6. FIGS. 9 and 10 are flowcharts showing the details of the layout & print process. As shown in the flowchart of FIG. 9, when the program enters the routine, the CPU 30 first outputs print mode information, which specifies either marginless printing or standard printing with margins, to the printer 14 via the printer driver 63 at step S405. The print mode information is set in response to selection of the print mode 'With No Margins on Four Sides' in the data input box F4 on the input window for print specification shown in FIG. 8. The CPU 30 subsequently calculates vertical and lateral dimensions SAx and SAy of the image expressed by the master image data stored in the RAM 32, from the numbers of pixels and the resolutions of the master image data with regard to the length and the width at step S410. The CPU 30 then reads the output size SBx and SBy input in the 'Style Settings' area AR1 (vertical and lateral output dimensions) at step S420. In the case where the user clicks the radio button RB2 to specify the output size indirectly by the numbers of pages, the vertical and lateral output dimensions SBx and SBy are obtained by multiplying the numbers of pages by the size of printing paper input in the 'Paper Size' data input box F2.

The CPU 30 calculates the ratios of the output dimensions SBx and SBy to the dimensions SAx and SAy of the image expressed by the master image data with regard to the length and the width. Namely the CPU 30 calculates SBx/SAx (=vertical magnification) and SBy/SAy (=lateral magnification) at step S430. The CPU 30 compares the vertical magnification with the lateral magnification and registers the smaller value as a magnification K of the image at step S440.

Figure 11:
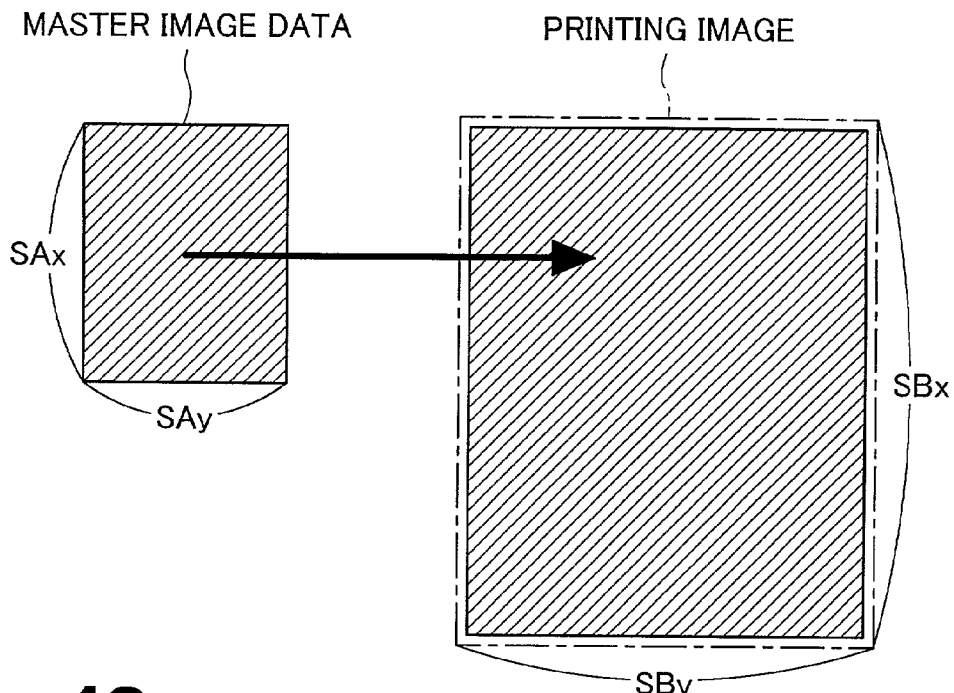
FIG. 11 shows a process of magnifying an image expressed by master image data.
Figure 12:
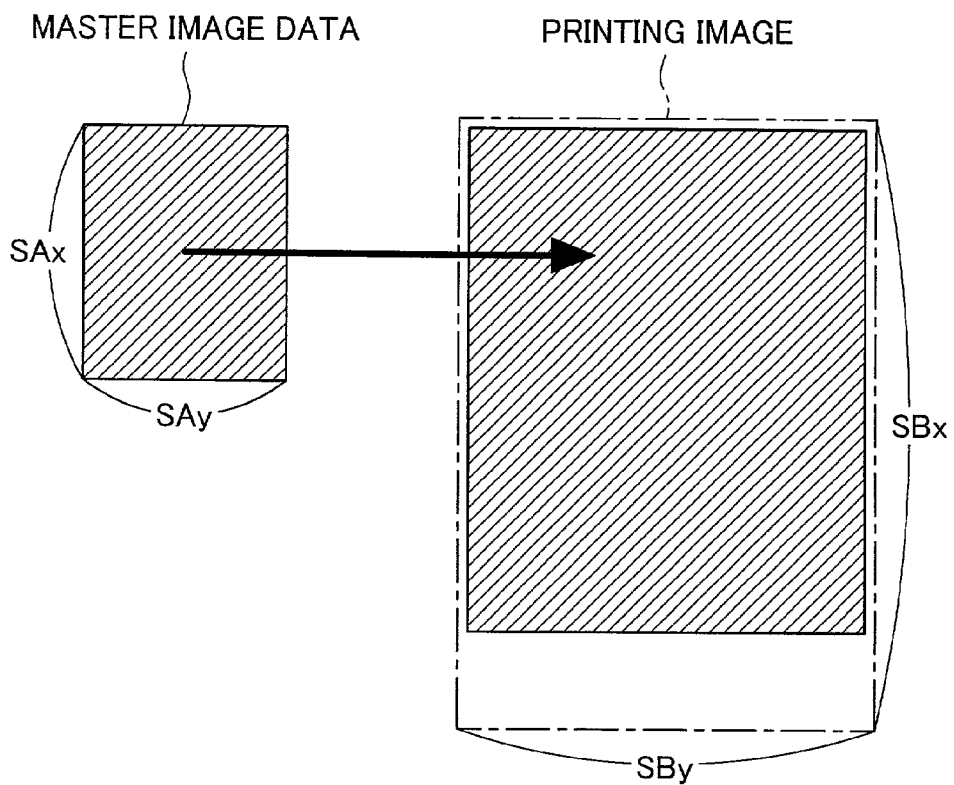
FIG. 12 shows another process of magnifying an image expressed by master image data.

The magnification K is registered as the ratio of enlargement in the process of converting the master image data into the size of the printing image as the output. In the case where the ratio of the vertical dimension SAx to the lateral dimension SAy of the master image data is equal to the ratio of the vertical dimension SBx to the lateral dimension SBy of the printing image, the magnification K means that the image expressed by the master image data is enlarged to the size of the printing image with regard to both the length and the width as shown in FIG. 11. For convenience of illustration, the printing image is drawn to be slightly greater than the enlarged image, although the size of the printing image is actually coincident with the size of the enlarged image. Such exaggeration is also applied to FIG. 12. In the case where the ratio of the vertical dimension SAx to the lateral dimension SAy of the master image data is different from the ratio of the vertical dimension SBx to the lateral dimension SBy of the printing image, on the other hand, the magnification K means that the length and the width of the image expressed by the master image data are enlarged by the same magnification until either the enlarged length or the enlarged width is coincident with the length or the width of the printing image as shown in FIG. 12. Namely one of the length and the width of the enlarged image has the dimension identical with the dimension of the printing image, whereas the other of the length and the width of the enlarged image has a margin relative to the dimension of the printing image.

After execution of step S440, the CPU 30 multiplies the size of printing paper (vertical and lateral dimensions) PPx and PPy input in the 'Paper Size' data input box F2 by 1/K, so as to calculate vertical and lateral dimensions OPPx and OPPy of the area on the master image data corresponding to the printing paper at step S450. The CPU 30 then calculates the numbers of sheets of printing paper arranged in length and width for the printing image, from the output size (vertical and lateral output dimensions) SBx and SBy input in the 'Style Setting' area AR1 and the size of printing paper (vertical and lateral dimensions) PPx and PPy input in the 'Paper Size' data input box F2 at step S460. The calculated numbers of sheets are, for example, 'a' pages in length and 'b' pages in width (where 'a' and 'b' are positive numbers). When the radio button RB2 is clicked to specify the output size by the numbers of pages, the input data is utilized without any further calculation.

At subsequent step S470, the CPU 30 sets multiple areas S1 through Sn (where n is a positive number), which correspond to respective unit pages to be printed, in the master image data stored in the RAM 32 at step S200, based on the vertical and lateral dimensions OPPx and OPPY of the area calculated at step S450 and the numbers of sheets of printing paper in length and width calculated at step S460.

Figure 13A:
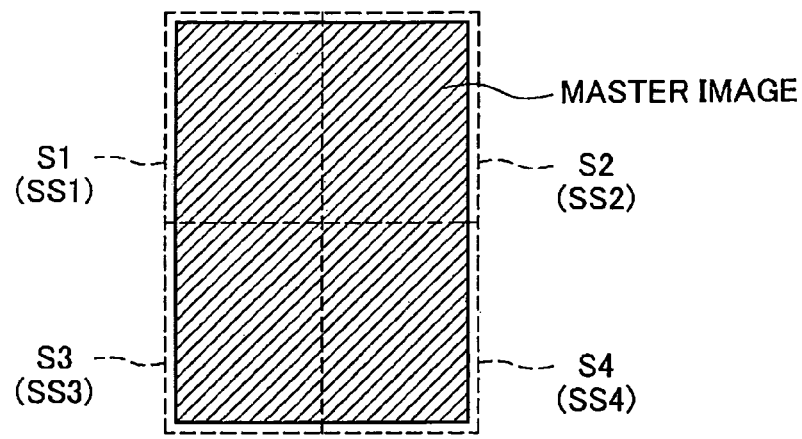
FIGS. 13A-13C shows various examples of areas S1 through Sn set in the master image data.
Figure 13B:
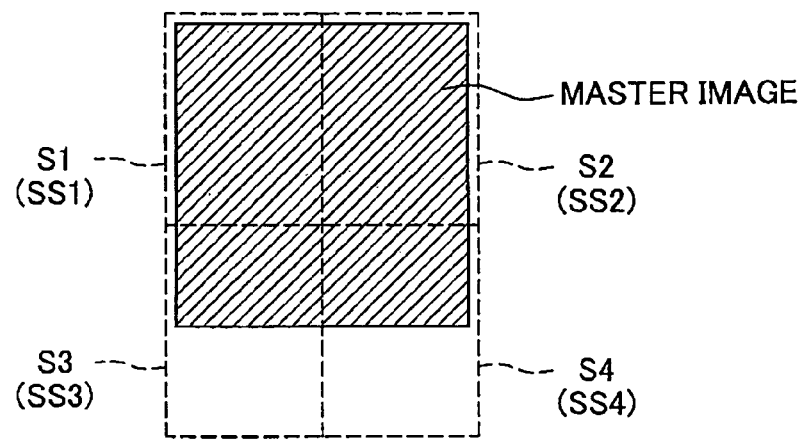
Figure 13C:
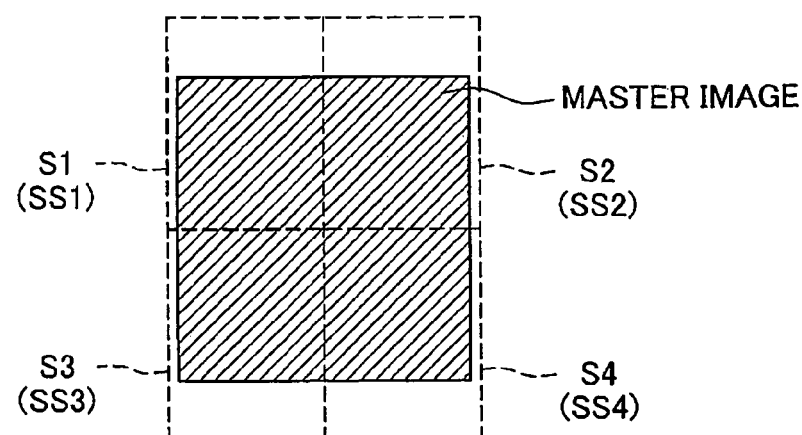

FIG. 13A-13C shows various examples of areas S1 through Sn set in the master image data. In the example of FIG. 13A, the image expressed by the master image data is just covered over with multiple areas S1, S2, S3, and S4. For convenience of illustration, the areas are drawn to be slightly greater than the master image, although the size of the master image is actually coincident with the combination of the multiple areas. Such exaggeration is also applied to FIGS. 13B and 13C. In the example of FIG. 13B, the partial areas S3 and S4 are extended from the image expressed by the master image data. In the example of FIG. 13C, all the areas S1, S2, S3, and S4 are extended from the image expressed by the master image data. These areas S1, S2, S3, and S4 are adjacent to one another, and are neither overlapped nor apart from one another. The selection between the layout of FIG. 13A and the layout of either FIG. 13B or FIG. 13C depends upon the vertical and lateral dimensions OPPx and OPPy of the area and the numbers of sheets of printing paper 'a' and 'b' arranged in length and width. The selection between the layout of FIG. 13B and the layout of FIG. 13C is based on a preset rule that the blank part is to be biased on one side or to be dispersed equally.

Figure 14:
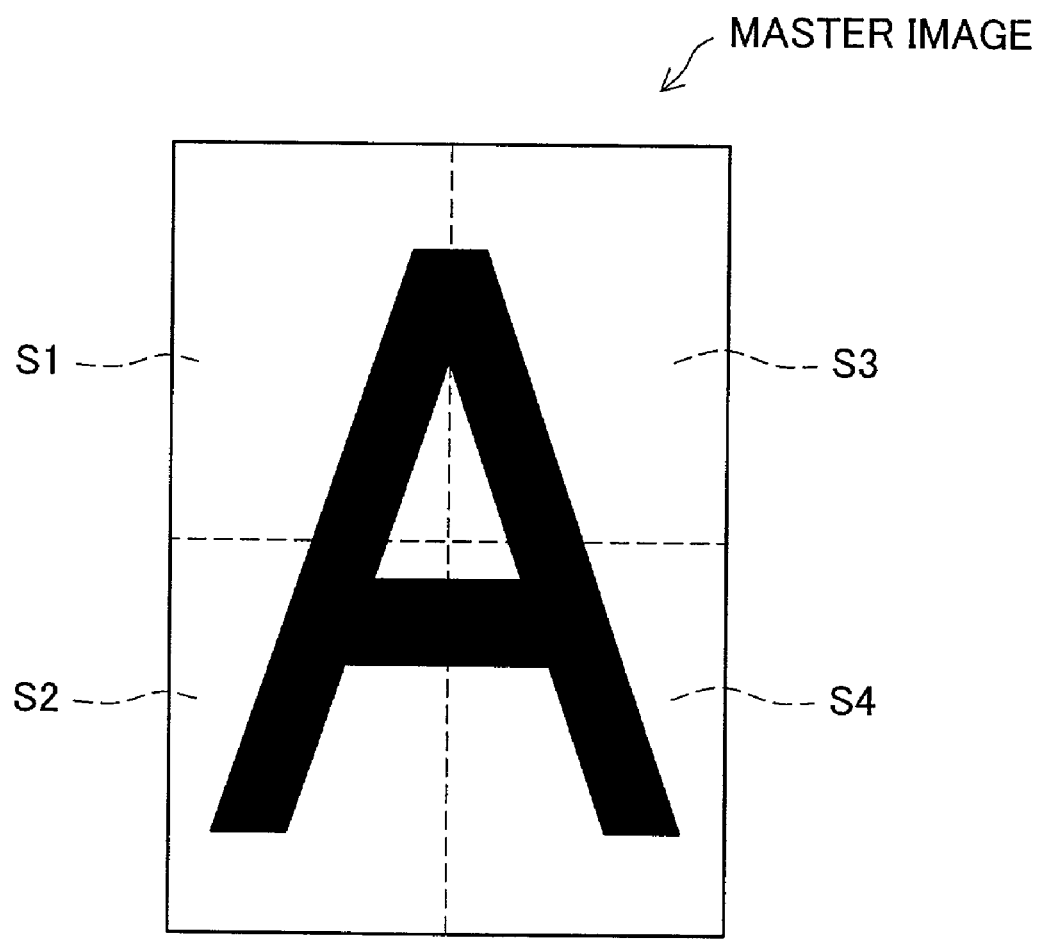
FIG. 14 shows another example of areas S set in the master image data.

FIG. 14 shows another example of areas S set in the master image data. When the master image data of the size A4 is subjected to poster printing of the size A2 (this is 2×2-fold of the size A4), the procedure equally divides the image expressed by the master image data into the total of four, that is, two in the vertical direction and two in the horizontal direction, and sets the areas S1, S2, S3, and S4 as illustrated in FIG. 14. Referring to the flowchart of FIG. 10, after execution of step S470, the CPU 30 initializes a variable 'i' to 1 at step S480 and determines whether the selected print mode is marginless printing or standard printing at step S490. The determination is based on the settings of the print mode information in the data input box F4 on the input window for print specification shown in FIG. 8. When it is determined that the selected print mode is marginless printing, the CPU 30 enlarges the area Si at step S491, which is specified by the variable 'i' among the areas S1 through Sn set at step S470.

The enlargement process enlarges the area Si in the four directions, upward, downward, leftward, and rightward. The quantities of enlargement are specified corresponding to the enlarged printing area for the size A4 mentioned previously (the quantity of enlargement on the front side: 3 mm, the quantity of enlargement on the rear side: 5 mm, the quantity of enlargement on the left and right sides: 2.5 mm) when the master image data is magnified by the magnification K. More concretely, division of the respective quantities of enlargement by the magnification K gives the factors of enlargement, that is, 3/K mm upward, 5/K mm downward, and 2.5/K mm leftward and rightward. The enlargement process enlarges the area S1 of FIG. 14 in the four directions, upward, downward, leftward, and rightward as shown in FIG. 15(a). In the illustration, all the four directions, the top, bottom, left, and right are enlarged by a substantially equal quantity of enlargement. This is only for convenience of illustration, and the actual quantities of enlargement follow the above rule. Such exaggeration is adopted in other equivalent drawings.

Referring back to the flowchart of FIG. 10, when it is determined at step S490 that the selected print mode is standard printing, the enlargement process of step S491 is omitted. The CPU 30 then extracts image data included in the area Si at step S492. In the case of marginless printing, image data is extracted from the area Si enlarged at step S491. For example, the image data is extracted as shown in FIG. 15(b). When there is no master image data in a certain direction of the enlarged area (upward and leftward in the illustrated example), an image identical with the line of the side in the certain direction (the top side and the left side in the illustrated example) is written in the enlarged area for extraction. The blank part as shown in FIG. 13B or FIG. 13C is extracted as space data.

The CPU 30 subsequently magnifies the image data extracted at step S492 by a magnification K at step S493. For example, in the case of poster printing the master image data of the size A4 to the size A2, the image data is magnified by the magnification 2 both in the vertical direction and in the lateral direction as shown in FIG. 15(c). The magnification maps the color density of one pixel in the extracted image data to a 2×2 area including two pixels in length and two pixels in width. This procedure applies the same color density for mapping of each pixel. Another applicable procedure may take into account the color densities of peripheral pixels and applies an intermediate color density for mapping.

Referring back again to the flowchart of FIG. 10, after execution of step S493, the program proceeds to step S494. The CPU 30 outputs the image data magnified to the K times at step S493 as page image data to the printer 14 via the printer driver 63 at step S494. The CPU 30 then increments the variable 'i' by one at step S495 and compares the variable 'i' with the value 'n' at step S496. When the variable 'i' is not greater than the value 'n', the program returns to step S490 and iteratively carries out the processing of steps S490 to S496. The iterative execution results in sequentially outputting the page image data with regard to the area S1 to the area Sn to the printer 14 via the printer driver 63. When it is determined at step S496 that the variable 'i' is greater than the value 'n', the program goes to RETURN and exits from this processing routine.

The printer driver 63 receives the print mode information output at step S405 and determines whether or not the selected print mode is marginless printing based on the input print mode information. In the case of marginless printing, the printer driver 63 controls the printer 14 to print the respective page image data output at step S494 in a greater size of printing area that is enlarged from every side of the printing paper.

Figure 15:
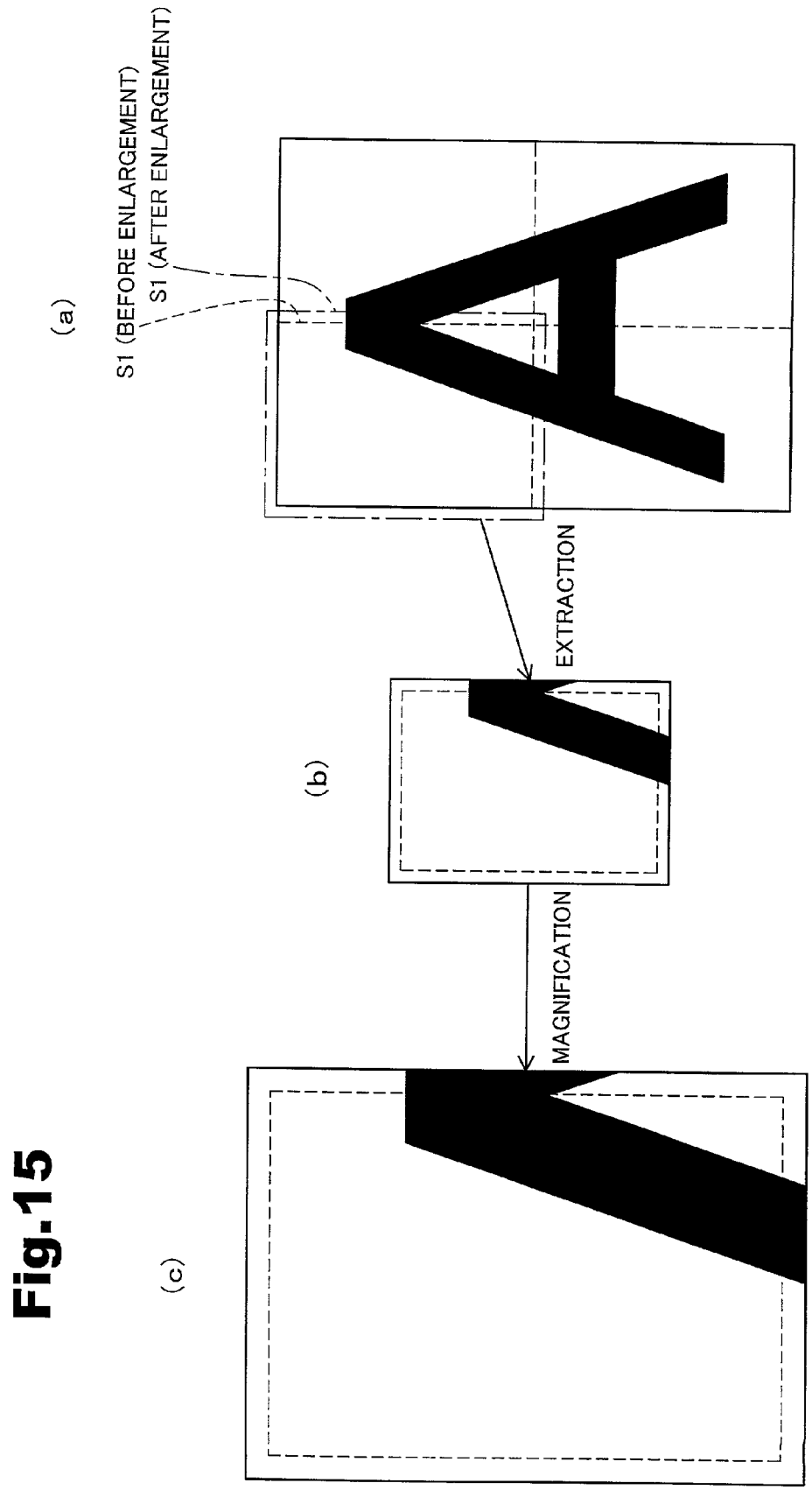
FIG. 15 shows the details of the enlargement & extraction process and the magnification process.
Figure 16:
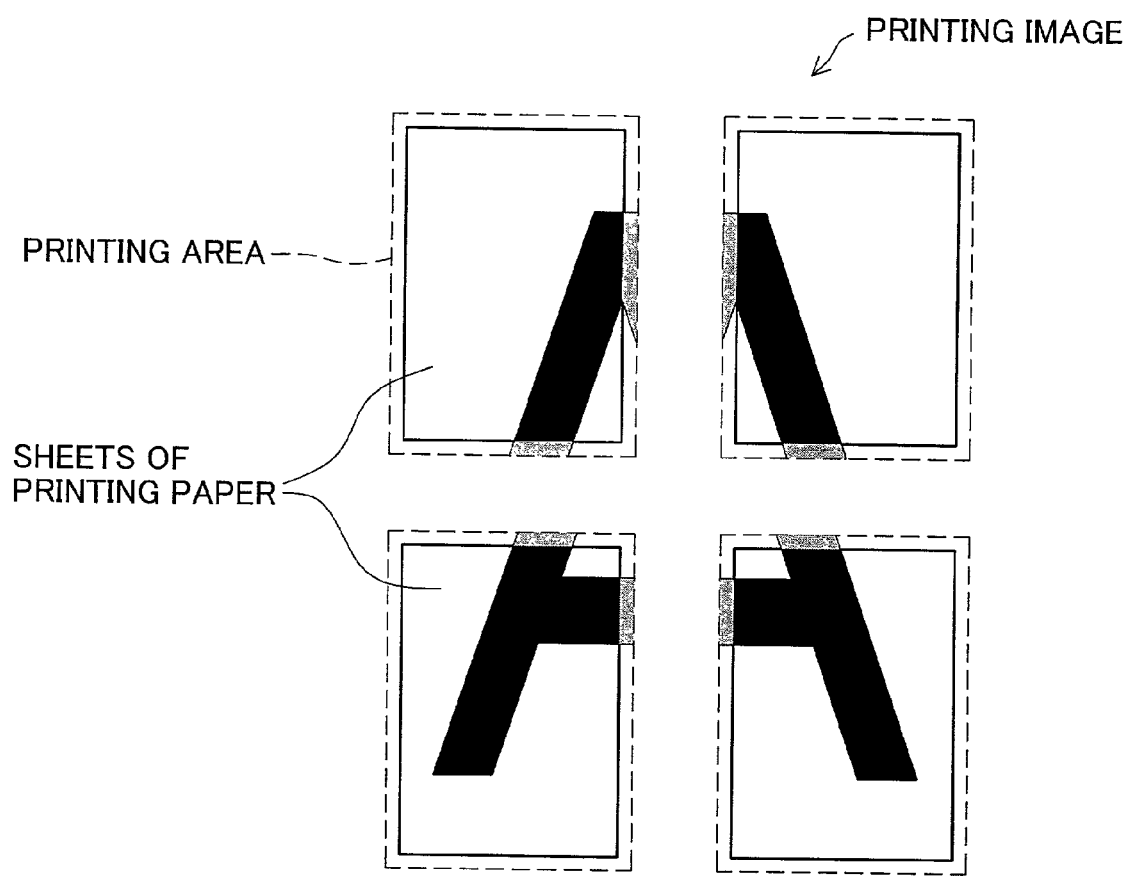
FIG. 16 shows an exemplified resulting image obtained by poster printing.

FIG. 16 shows a printing image actually printed in the example of FIGS. 14 and 15. This gives a printing result in the case of poster printing the master image data of the size A4 including the letter 'A' to the size A2. As illustrated, the actual printing area is a little greater than the size of the printing paper, so that an image part of the letter 'A' is printed to the top, bottom, left, and right sides of each sheet of printing paper. The image part printed on one sheet of printing paper is continuous with the image part printed on an adjoining sheet of printing paper. The computer system of the first embodiment enables the respective sheets of printing paper with the image parts printed thereon to be readily and precisely joined together without cutting the margins. This arrangement thus ensures the excellent workability of bonding and the favorable finish of the resulting large print obtained by bonding.

The structure of this embodiment enables the user to select the desired print mode between marginless printing and standard printing in the data input box F4 on the input window for print specification, thus ensuring the excellent workability. In this embodiment, both the 'Style Settings' area AR1 for poster printing and the data input box F4 for selectively specifying the print mode 'With No Margins on Four Sides' are provided on the identical input window for print specification. This ensures the excellent operatability.

In the above embodiment, the area setting module 61a corresponds to step S470 shown in FIG. 9, the enlargement-extraction module 61b corresponds to step S491 and S492 shown in FIG. 10, and the magnification module 61c corresponds to step S493 shown in FIG. 10. Further the command output module 61d the corresponds to step S405 shown in FIG. 9, and the output module 61e corresponds to step S494 shown in FIG. 10.

A second embodiment of the present invention is discussed below. The procedure of the first embodiment sets the areas in the master image data prior to magnification of the master image data to the printing image. The procedure of the second embodiment, on the other hand, magnifies the image expressed by the master image data to a preset size of the printing image and then sets areas corresponding to page images in the magnified image. The details of the second embodiment are discussed below.

Figure 17:
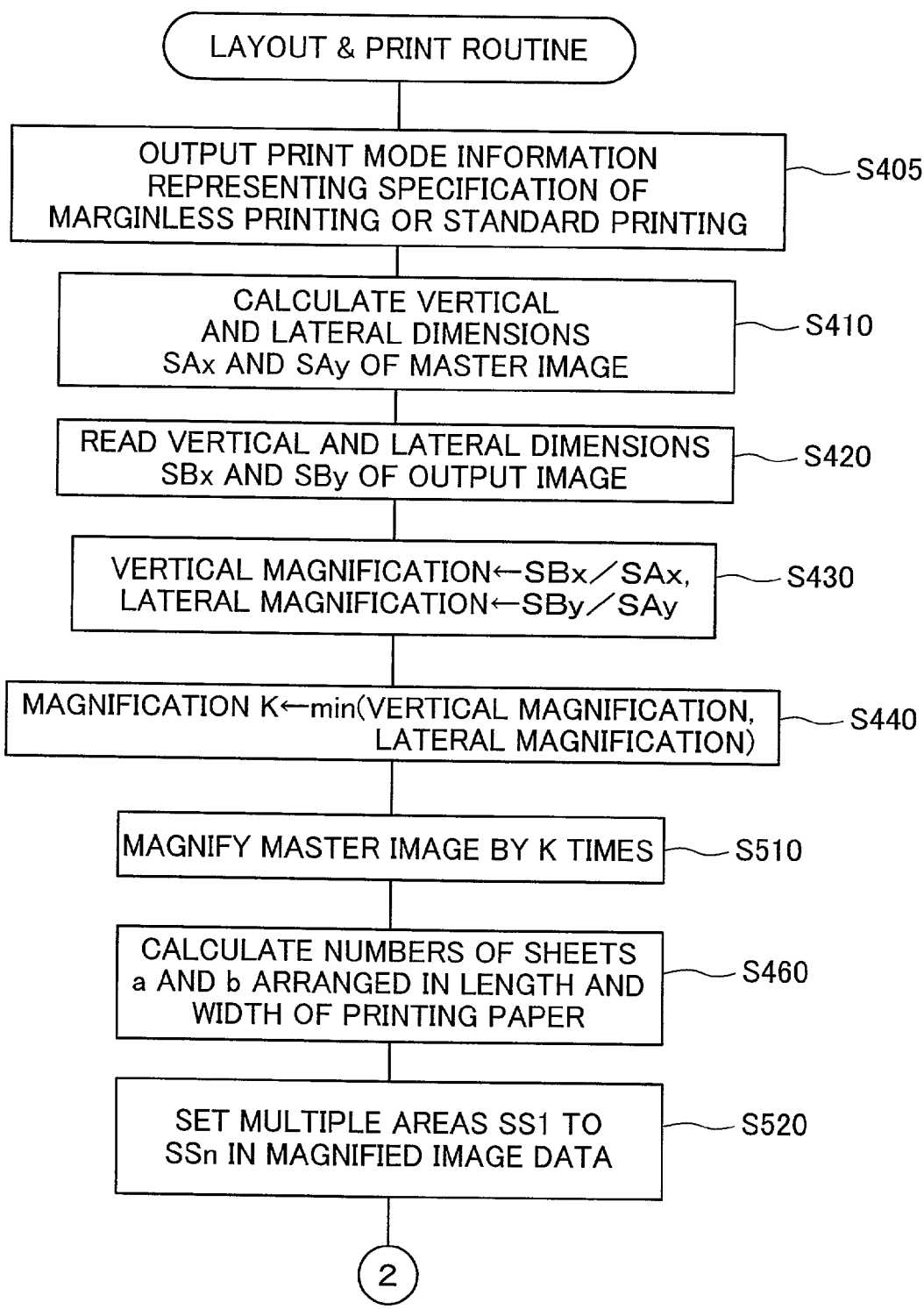
FIG. 17 is a flowchart showing a first half of a layout & print process carried out in a second embodiment of the present invention.
Figure 18:
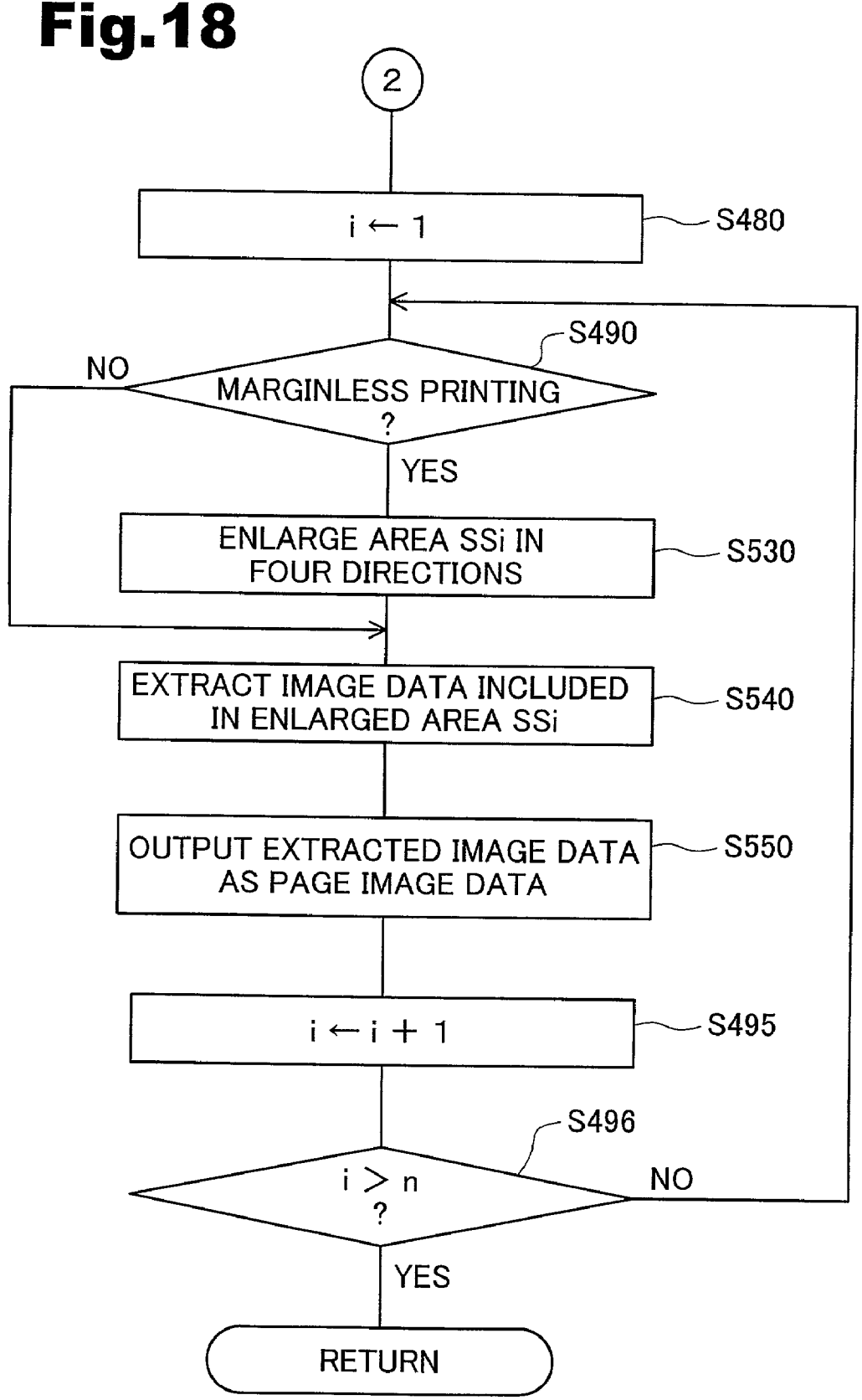
FIG. 18 is a flowchart showing a second half of the layout-& print process carried out in the second embodiment of the present invention.

The second embodiment has the same hardware construction as that of the first embodiment and the similar software configuration to that of the first embodiment except the layout & print process. FIGS. 17 and 18 are flowcharts showing the details of the layout & print process executed in the second embodiment. The processing of steps S405 to S440, S460, S480, S490, S495, and S496 in the flowcharts of FIGS. 17 and 18 are identical with the processing of the corresponding steps of the first embodiment. When the program enters the processing routine shown in FIG. 17, the CPU 30 carries out the processing of steps S405 to S440 and then magnifies the master image expressed by the master image data by the magnification K at step S510.

FIG. 19 shows an example of magnifying a master image. Like the example discussed previously, in the case of poster printing master image data of the size A4 to the size A2, the image expressed by the master image data is magnified twice both in the vertical direction and in the lateral direction.

Referring back to the flowchart of FIG. 17, after execution of step S510, the CPU 30 carries out the processing of step S460 discussed in the first embodiment. At subsequent step S520, the CPU 30 sets multiple areas SS1 through SS*n* (where each area has identical dimensions with those of the printing paper and n is a positive number) in the master image data magnified at step S510, based on the size of the printing paper (the vertical and lateral dimensions) PPx and PPy input in the 'Paper Size' data input box F2 and the numbers of sheets 'a' and 'b' arranged in length and width of the printing paper calculated at step S460.

The examples shown in FIGS. 13A-13C are also applicable to the process of setting the multiple areas in this second embodiment, provided that the master image data is replaced by the master image data magnified at step S510 and the areas S1 through S4 are replaced by the areas SS1 through SS4. In the example of FIG. 13A, the image expressed by the magnified master image data is just covered over with multiple areas SS1, SS2, SS3, and SS4. In the example of FIG. 13B, the partial areas SS3 and SS4 are extended from the image expressed by the magnified master image data. In the example of FIG. 13C, all the areas SS1, SS2, SS3, and SS4 are extended from the image expressed by the magnified master image data. These areas SS1, SS2, SS3, and SS4 are adjacent to one another, and are neither overlapped nor apart from one another. The selection between the layout of FIG. 13A and the layout of either FIG. 13B or FIG. 13C depends upon the vertical and lateral dimensions OPPx and OPPy of the area and the numbers of sheets of printing paper 'a' and 'b' arranged in length and width. The selection between the layout of FIG. 13B and the layout of FIG. 13C is based on a preset rule that the blank part is to be biased on one side or to be dispersed equally.

Figure 20:
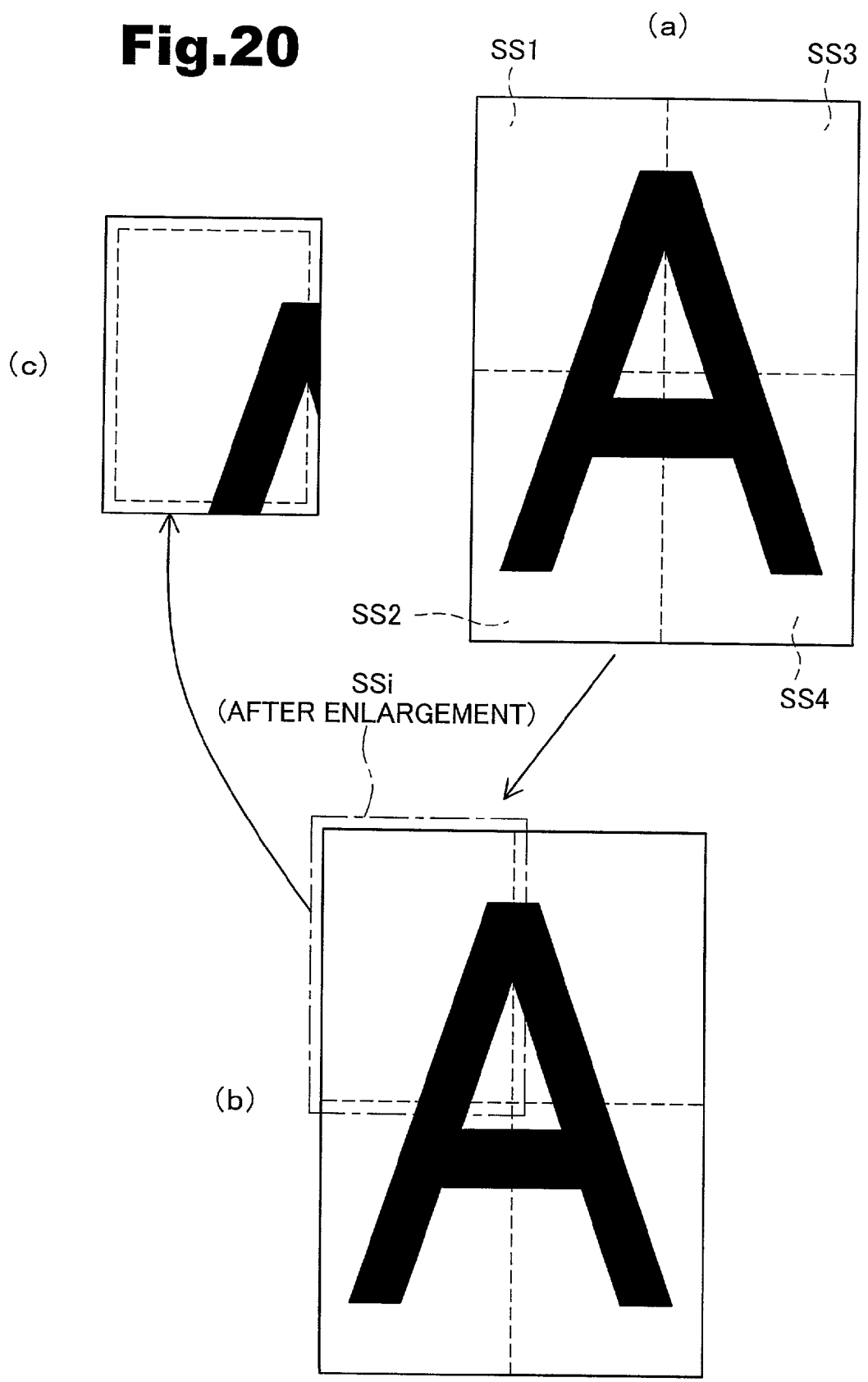
FIG. 20 shows a process of area setting, enlargement, and extraction.

In the case of poster printing the master image data of the size A4 to the size A2, the procedure sets the areas SS1 through SS4 on the image expressed by the magnified master image data as shown in FIG. 20(*a*). After execution of step S520 in the flowchart of FIG. 17, the program proceeds to step S480 in the flowchart of FIG. 18. The CPU 30 carries out the processing of steps S480 and S490, which is identical with the processing of the first embodiment. When it is determined at step S490 that the selected print mode is marginless printing, the CPU 30 enlarges the area SS*i* at step S530, which is specified by the variable 'i' among the areas SS1 through SS*n* set at step S520.

The enlargement process enlarges the area SS*i* in the four directions, upward, downward, leftward, and rightward. The quantities of enlargement are specified corresponding to the enlarged printing area for the size A4 mentioned previously (the quantity of enlargement on the front side: 3 mm, the quantity of enlargement on the rear side: 5 mm, the quantity of enlargement on the left and right sides: 2.5 mm). The enlargement process enlarges the area SS1 of FIG. 20(*a*) in the four directions, upward, downward, leftward, and rightward as shown in FIG. 20(*b*). In the illustration, all the four directions, the top, bottom, left, and right are enlarged by a substantially equal quantity of enlargement. This is only for convenience of illustration, and the actual quantities of enlargement follow the above rule. Such exaggeration is adopted in FIG. 20(*c*).

Referring back to the flowchart of FIG. 18, when it is determined at step S490 that the selected print mode is standard printing, the enlargement process of step S530 is omitted. The CPU 30 then extracts image data included in the area SS*i* at step S540. In the case of marginless printing, image data is extracted from the area SS*i* enlarged at step S530. For example, the image data is extracted as shown in FIG. 20(*c*). When there is no master image data in a certain direction of the enlarged area (upward and leftward in the illustrated example), an image identical with the line of the side in the certain direction (the top side and the left side in the illustrated example) is written in the enlarged area for extraction. The blank part as shown in FIG. 13B or FIG. 13C is extracted as space data.

Referring back again to the flowchart of FIG. 18, the CPU 30 outputs the image data extracted at step S540 as page image data to the printer 14 via the printer driver 63 at step S550. The CPU 30 then increments the variable 'i' by one at step S495 and compares the variable 'i' with the value 'n' at step S496. When the variable 'i' is not greater than the value 'n', the program returns to step S490 and iteratively carries out the processing of steps S490 to S496. The iterative execution results in sequentially outputting the page image data with regard to the area SS1 to the area SS*n* to the printer 14 via the printer driver 63. When it is determined at step S496 that the variable 'i' is greater than the value 'n', the program goes to RETURN and exits from this processing routine.

The procedure of the second embodiment gives a printing result equivalent to that of the first embodiment shown in FIG. 16. Like the first embodiment, the computer system of the second embodiment enables the respective sheets of printing paper with the image parts printed thereon to be readily and precisely joined together without cutting the margins. This arrangement thus ensures the excellent workability of bonding and the favorable finish of the resulting large print obtained by bonding.

The procedure of the first embodiment sets the areas prior to magnification of the master image data and thus enables the process of enlargement and extraction to be carried out by the unit area set in the master image data. The procedure of the second embodiment, on the other hand, magnifies the whole image expressed by the master image data to a preset size of the printing image and then sets the areas in the magnified image. The second embodiment accordingly requires a memory for storing the whole printing image. The configuration of the first embodiment thus saves the memory capacity for storing image data, compared with the configuration of the second embodiment.

A third embodiment of the present invention is described briefly. The procedure of the second embodiment magnifies the image expressed by the master image data to a preset size of the printing image and divides the magnified image. The procedure of the third embodiment, on the other hand, registers an image of a relatively large size as the printing image in a storage device like the HDD 42 and divides the registered printing image. The procedure of the third embodiment omits the processing of steps S410, S430, S440, and S510 in the layout & print routine of the second embodiment shown in the flowchart of FIG. 17 and specifies the print image data registered in the HDD 42 to represent the printing image as the image data of interest in the processing flow of and after step S520 in the flowcharts of FIGS. 17 and 18.

Like the first and the second embodiments discussed above the procedure of the third embodiment enables the respective sheets of printing paper with the image parts printed thereon to be readily and precisely joined together without cutting the margins. This arrangement thus ensures the excellent workability of bonding and the favorable finish of the resulting large print obtained by bonding.

Some examples of possible modification are briefly described below.

(1) In the structure of the first embodiment, the three buttons BT1, BT2, and BT3 'Photograph Selection', 'Print Specification', and 'Layout & Print' are provided on the application window WD to simultaneously carry out the layout process and the printing process. In one possible modification, four buttons 'Photograph Selection', 'Print Specification', 'Layout', and 'Print' are provided to individually carry out the layout process and the printing process. Such modification enables a resulting image expected to be printed on the respective sheets of printing paper in poster printing to be displayed on the screen as a preview image. The operator checks the preview image and shifts the processing flow to the printing process based on the check.

(2) In the above embodiments, the printer 14 is exclusively used for printing the A4-size printing paper. The printer 14 may be applicable for other sizes of printing paper, for example, the size B5, the size B4, and the size A3.

(3) In the above embodiment, the 'marginless printing' represents printing without any margins on the four sides of printing paper. In one possible modification, in the marginless print mode, margins may be left on the top and bottom sides whereas no margins are set on the left and right sides of printing paper.

(4) In the above embodiments, the printer 14 locally connected to the computer main body 16 is applied for the printing device of the present invention. The printing device may alternatively be a printer connected to a network like Ethernet. The technique of the present invention is not restricted to the printers but is also applicable to other printing devices like photocopiers and facsimiles.

The above embodiments and their modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The scope and spirit of the present invention are indicated by the appended claims, rather than by the foregoing description.

What is claimed is:

1. A print controller that magnifies an image expressed by master image data by a predetermined magnification and causes the magnified image to be divisionally printed in plural sheets of printing paper, said print controller comprising:

a command output module that outputs a command, which instructs printing in a printing area of a greater size than a size of the printing paper actually used for printing, to a printing device, the greater size being greater than the size of the printing paper by a preset quantity of enlargement;

an area setting module that sets multiple areas adjacent to one another in the master image data, where each of the multiple areas corresponds to each unit page to be printed;

an enlargement-extraction module that enlarges each of the areas, which are set by said area setting module, by dimensions that are obtained by dividing the preset quantity of enlargement by the predetermined magnification and sequentially extracts image data included in each enlarged area;

a magnification module that magnifies each of the image data, which is extracted by said enlargement-extraction module, by the predetermined magnification; and an output control module that outputs each of the magnified image data corresponding to the printing area of the greater size to the printing device.

2. A print controller in accordance with claim 1, said print controller further comprising:

a marginless printing specification module that accepts marginless printing specification, which represents printing without any margins on respective sides of printing paper; and a module that, only when said marginless printing specification module accepts the marginless printing specification, activates said enlargement-extraction module to enlarge each of the areas while activating said marginless print command output module to output the command, which instructs printing in the printing area of the greater size.

3. A print controller in accordance with claim 2, said print controller further comprising:

a first input setting module that sets a first data input box on a window for data input displayed on a display device, where various pieces of information with regard to divisional printing to the multiple sheets of printing paper are input in the first data input box, said marginless printing specification module comprising:

a second input setting module that sets a second data input box, where the marginless printing specification is accepted, on the window with the first data input box.

4. A print control method that magnifies an image expressed by master image data by a predetermined magnification and causes the magnified image to be divisionally printed in plural sheets of printing paper, said print control method comprising the steps of:

(a) outputting a command, which instructs printing in a printing area of a greater size than a size of the printing paper actually used for printing, to a printing device, the greater size being greater than the size of the printing paper by a preset quantity of enlargement;

(b) setting multiple areas adjacent to one another in the master image data, where each of the multiple areas corresponds to each unit page to be printed;

(c) enlarging each of the areas, which are set in said step (b), by dimensions that are obtained by dividing the preset quantity of enlargement by the predetermined magnification and sequentially extracting image data included in each enlarged area;

(d) magnifying each of the image data, which is extracted in said step (c), by the predetermined magnification; and (e) outputting each of the magnified image data corresponding to the printing area of the greater size to the printing device.

5. A computer-readable storage medium encoded with a computer program, said computer program functioning to magnify an image expressed by master image data by a predetermined magnification and cause the magnified image to be divisionally printed in plural sheets of printing paper, said computer program causing a computer to attain the functions of:

(a) outputting a command, which instructs printing in a printing area of a greater size than a size of the printing paper actually used for printing, to a printing device, the greater size being greater than the size of the printing paper by a preset quantity of enlargement;

(b) setting multiple areas adjacent to one another in the master image data, where each of the multiple areas corresponds to each unit page to be printed;

(c) enlarging each of the areas, which are set by said function (b), by dimensions that are obtained by dividing the preset quantity of enlargement by the predetermined magnification and sequentially extracting image data included in each enlarged area;

(d) magnifying each of the image data, which is extracted by said function (c), by the predetermined magnification; and (e) outputting each of the magnified image data corresponding to the printing area of the greater size to the printing device.

6. A computer-readable storage medium in accordance with claim 5, wherein said computer program further causes the computer to attain the functions of:

(f) accepting marginless printing specification, which represents printing without any margins on respective sides of printing paper; and (g) only when the marginless printing specification is accepted by said function (f), activating said function (c) to enlarge each of the areas while activating said function (a) to output the command, which instructs printing in the printing area of the greater size.

7. A computer-readable storage medium in accordance with claim 6, Wherein said computer program further causes the computer to attain the function of:

(h) setting a first data input box on a window for data input displayed on a display device, where various pieces of information with regard to divisional printing to the multiple sheets of printing paper are input in the first data input box.

said function (f) comprising the function of:

(f-1) setting a second data input box, where the marginless printing specification is accepted, on the window with the first data input box.

* * * * *